United States Patent
Petersson

(10) Patent No.: US 6,567,670 B1
(45) Date of Patent: May 20, 2003

(54) SUBSCRIBER STATION, NETWORK CONTROL MEANS AND METHOD FOR TRIGGERING INTER-FREQUENCY MEASUREMENTS IN A MOBILE COMMUNICATION SYSTEM

(75) Inventor: Justus Petersson, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 496 days.

(21) Appl. No.: 09/651,012

(22) Filed: Aug. 30, 2000

(30) Foreign Application Priority Data

Aug. 31, 1999 (EP) .............................. 99117127

(51) Int. Cl.$^7$ .......................... H04G 7/00; H04B 7/005; H04B 7/216; H04Q 7/38
(52) U.S. Cl. ...................... 455/522; 455/436; 370/331; 370/333
(58) Field of Search ................................ 455/436, 437, 455/443, 438, 444, 447, 525; 370/331, 332, 333, 329, 318; 379/59

(56) References Cited

U.S. PATENT DOCUMENTS

| | | | | |
|---|---|---|---|---|
| 5,594,718 A | * | 1/1997 | Weaver et al. | 370/331 |
| 5,594,780 A | * | 1/1997 | Wiedeman et al. | 455/430 |
| 5,828,661 A | * | 10/1998 | Weaver et al. | 370/331 |

(List continued on next page.)

FOREIGN PATENT DOCUMENTS

WO  WO 99 43178  8/1999

OTHER PUBLICATIONS

Behringer, L.V., Eurpoean Search Report, App. No. EP 99117127, Jan. 14, 2000, pp. 1–5.

TS 25.231 V0.3.0 (Jun. 1999); Technical Specification; 3$^{rd}$ Generation Partnership Project (3GPP); Technical Specification Group (TSG) Radio Access Network (RAN); Working Group 1 (WG1); Physical layer—Measurements, XP002127381.

TS 25.214 V1.1.0 (Jun. 1999); Technical Specification; 3$^{rd}$ Generation Partnership Project (3GPP); Technical Specification Group (TSG) Radio Access Network (RAN); Working Group 1 (WG1); Physical layer procedures (FDD).

TS 25.201 V2.1.0 (Jun. 1999); Technical Specification; 3$^{rd}$ Generation Partnership Project (3GPP); Technical Specification Group (TSG) Radio Access Network (RAN); Working Group 1 (WG1); Physical layer—General description.

*Primary Examiner*—Vivian Chin
*Assistant Examiner*—Kamran Afshar
(74) *Attorney, Agent, or Firm*—Jenkens & Gilchrist, P.C.

(57) ABSTRACT

A quality measurement means (QMM) provided in a network control means (RNC) of a communication system (T1) monitors the transmission quality on the down link (DL) of a communication connection (CC) between the subscriber station (MS) and the base transceiver station (RBS). A network IF handover means generates a network IF measurement trigger signal (NIFTS) when the transmission quality drops under a predetermined quality measure (QoS-MS). The generated network (IF) measurement trigger signal (NIFTS) is sent to the subscriber station (MS) and an IF measurement means (IFMM) in the subscriber station (MS) starts the IF measurements in response to a receipt of the network IF measurement trigger signal (NIFTS). One example of evaluating the quality on the down link of the communication connection (CC) is to monitor the transmitted output power on the down link. Thus, the network control means (RNC) can independently generate the trigger signal without the need of measurements from the subscriber station (MS) and without an additional interference on the up link due to a transmission of such measurements and without an unnecessary reduction of the lifetime of the battery of the subscriber station (MS).

53 Claims, 12 Drawing Sheets

U.S. PATENT DOCUMENTS

| | | | |
|---|---|---|---|
| 5,848,063 A | * 12/1998 | Weaver et al. | 370/331 |
| 5,940,762 A | * 8/1999 | Lee et al. | 455/442 |
| 6,069,880 A | * 5/2000 | Owen et al. | 370/311 |
| 6,128,506 A | * 10/2000 | Knutsson et al. | 455/522 |
| 6,236,860 B1 | * 5/2001 | Hagting et al. | 455/436 |
| 6,507,570 B1 | * 1/2003 | Holma et al. | 370/333 |

* cited by examiner

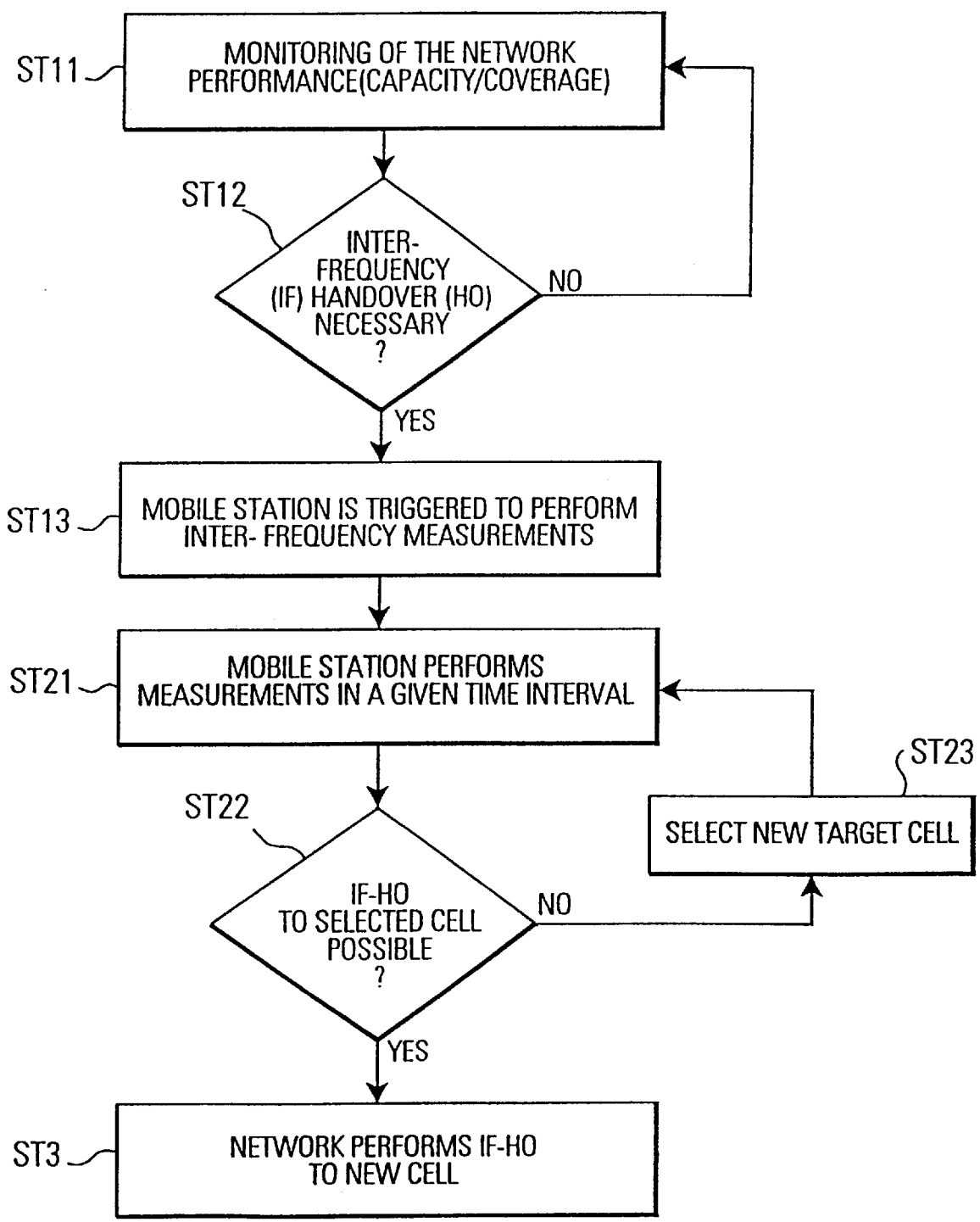

FIG. 5 PRIOR ART
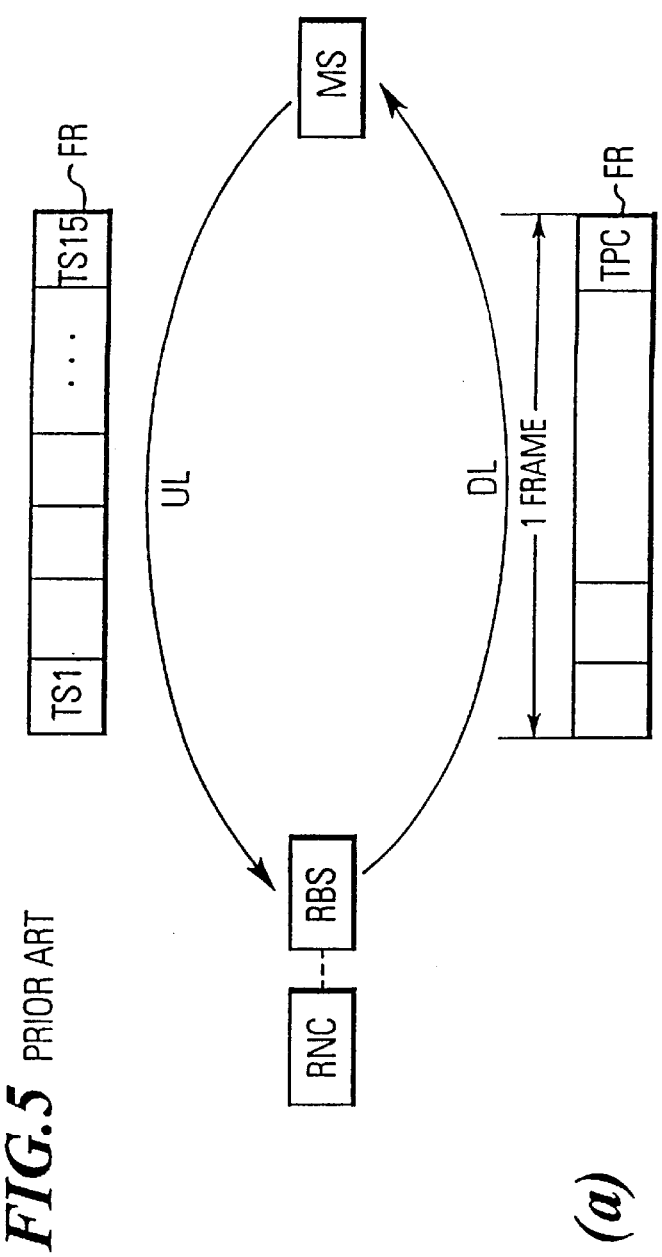
(a)
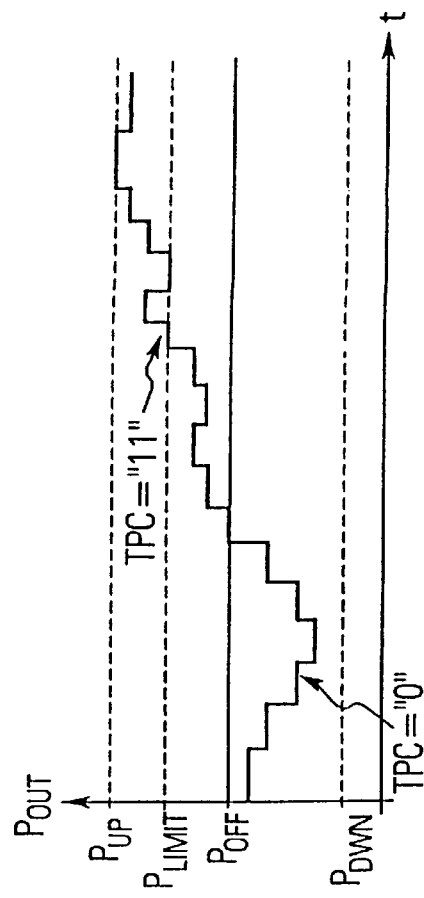
(b)

SUBSCRIBER STATION, NETWORK CONTROL MEANS AND METHOD FOR TRIGGERING INTER-FREQUENCY MEASUREMENTS IN A MOBILE COMMUNICATION SYSTEM

FIELD OF THE INVENTION

The invention relates to a subscriber station, a network control means and a method for triggering inter-frequency measurements in a mobile communication system. The invention also relates to a mobile communication system in which such a subscriber station, such a network control means and such a method are employed.

As will be explained with more details below, in a mobile communication system transmission conditions on a connection (communication connection or signaling connection) between a subscriber station and a base transmitter station are monitored and the need for an inter-frequency or inter-system handover is detected, e.g. when the transmission conditions deteriorate. When the need for an inter-frequency or inter-system handover is detected, an inter-frequency measurement trigger signal is generated to indicate the need for an inter-frequency or inter-system handover and to initiate inter-frequency measurements on a different frequency than currently used. In response to the trigger signal inter-frequency measurements are carried-out on one or more different frequencies and if a suitable new frequency has been found the actual an inter-frequency or inter-system handover takes place. Hereinafter, the term "handover" is used to designate an inter-frequency handover or an inter-system handover, even if not explicitly stated.

When a connection is established between the base transceiver station and the subscriber station, even if only a signaling connection is established with the subscriber station being in an active-mode of operation, there always exists some data traffic on the connection and the subscriber station and the network must must carry out inter-frequency measurements when no data is transmitted, since otherwise some of the communicated data on the connection will be lost. Another important aspect is when and how the inter-frequency measurement trigger signal should be generated by the network to initiate the inter-frequency measurements. It should be noted that the inter-frequency measurements themselves are, however, always carried out in the subscriber station in response to the inter-frequency measurement trigger signal.

The present invention in particular addresses the problem which conditions should be used to generate the trigger signal for triggering such inter-frequency measurements.

Hereinafter inter-frequency will be abbreviated with "IF".

BACKGROUND OF THE INVENTION

With respect to a conventional method for triggering IF-measurements in a mobile communication system, FIG. 1 shows a general overview of a telecommunication system TELE which comprises at least two different mobile communication systems T1, T2. A subscriber station, e.g. a mobile station MS, which is operable in the first mobile communication system T1, may also be operable in the second mobile communication system T2. Within each mobile communication system T1, T2 the mobile station MS can move around different cells S1, S2, S3, S1', S3' and C1–C6. Due to different handover criteria the mobile station MS may perform an inter-frequency handover within the same system or an inter-system handover to/from the other system. It should be noted that the present invention is equally well applicable for triggering an inter-frequency handover within the same system and/or an inter-system handover and FIG. 1 only shows two mobile communication systems T1, T2 as an example where both such handover procedures may take place.

FIG. 1 shows as an example for the first mobile communication system T1 a WCDMA (Wideband Code Division Multiple Access) or CDMA (Code Division Multiple Access) communication system comprising a network control means RNC (Radio Network Controller), at least one base transceiver station RBS, RBS' (in WCDMA called radio base station), at least one subscriber station MS (Mobile Station) as well as a number of (possibly) overlapping cells S1, S2, S3, S1', S3'.

An example for the second mobile communication system T2 is a communication system according to the GSM (Global System for Mobile Communications), PDC (Personal Digital Cellular) and D-AMPS (Digital-Advanced Mobile Personal Service) standards.

In FIG. 1 an example of a GSM system is shown for the second mobile communication system T2. However, it should be noted that the invention can in principle be applied to any type of digital mobile telephone system and is as such not restricted to the aforementioned systems. The GSM system shown in FIG. 1 comprises the conventional units of a base station controller BSC, at least one mobile switching center MSC as well as a gateway mobile switching center GMSC. The mobile stations MS are served by a plurality of base transceiver stations BTS within the cells C1–C6 in which the mobile station MS can move around.

The network control means RNC of the WCDMA system in FIG. 1 is connected via a UMSC unit to the gateway mobile switching center GMSC of the GSM system.

Depending on the geographical layout of the first and second mobile communication systems T1, T2 the cells S1, S2, S3, S1', S3' of the first mobile communication system T1 may also completely or partially overlap with the cells C1–C6 of the second mobile communication system T2. Of course, if the mobile station MS is to carry out an inter-system handover—then the mobile station MS will be able to operate according to the specifications of the first and the second mobile communication system.

One reason for performing inter-frequency or inter-system handovers in the telecommunication system TELE in FIG. 1 may be due to coverage reasons. This is due to the fact that neither the first communication system nor any other system has a complete coverage in all geographical areas, e.g. hot spots in UMTS. Furthermore, some cells within the mobile communication system may operate on frequencies which are not applicable in adjacent cells. Therefore, by letting the mobile station MS or the network control means RNC perform either an inter-frequency handover of an inter-system handover, the mobile station MS can be used in a larger area without interruptions in the communication.

Another reason for the handover may be capacity reasons. Either the mobile communication system or other mobile communication systems may become heavily loaded at times, so that an inter-system handover may be required. Analogously, the mobile station MS may have established a connection on a particular frequency and it may be necessary that another frequency is to be used. This other frequency may be present within the same cell or in another cell and both are generally termed inter-frequency handover. As indicated in FIG. 1, the inter-frequency measurements (necessary for an inter-frequency handover/or an inter-system handover) is always carried-out by an inter-frequency measurement means IFMM situated in a mobile station MS.

The network control means RNC comprises a paging flag sending means PFSM for sending a paging flag to the mobile station MS when a signalling communication link has already been established between the subscriber station MS and the network. For example, when the mobile station MS has been switched on and has been registered in the network, the subscriber station is in a registered and non-active mode of operation. A standby operation means SOM holds the subscriber station in such a non-active mode of operation. In such a non-active mode of operation the operation of the subscriber station MS is invoked by receiving the paging flag PF from the network control means RNC, namely when a call is pending for the subscriber station SS and when a communication connection is to be set up to the subscriber station MS.

FIG. 2 shows a general flow chart of a method for carrying-out an inter-frequency or inter-system handover in a mobile communication system when a signaling connection or a communication connection is set up. In step ST11 a handover means HORM (HandOveR Means) situated in the network control means RNC or the mobile station MS monitors the network performance regarding the capacity/coverage aspects as explained above. In step ST12 the handover means HORM decides whether in principle a handover is necessary according to the criteria determined in step ST11. If so ("Y" in step ST12), the mobile station is triggered to perform inter-frequency measurements in step ST13. More particularly, in step ST13 an IF measurement trigger signal IFTS is output by the handover means HORM. As indicated in FIG. 1, the IF-measurements means IFMM can be triggered by a mobile-evaluated-handover trigger signal IFTS or a network-evaluated-handover trigger signal IFTS in step ST13.

In order to perform a fast and reliable inter-frequency handover when there is the need for such a handover, it is advantageous to provide-the outputting of a reliable trigger signal IFTS in either the network control means RNC and/or in the mobile station MS. Of course, in order to provide a well-designed trigger procedure, there is not a single triggering condition that needs to be monitored in step ST11 and which will eventually trigger the mobile station MS to perform IF-measurements on other frequencies or systems. Usually, a couple of conditions are monitored in step ST11 and must be fulfilled that the trigger signal is output in step ST13. Such conditions may for example comprise an excessively high output power from either the down-link (network to subscriber station) connection or the up-link (subscriber station to network) connection and/or a high load in the cell. If for example the network detects by measuring the uplink-interference a high load in the cell, it will attempt to trigger IF-measurements and thus a handover to a different cell or a different system. Likewise, if transmission conditions deteriorate, the mobile station MS is triggered to more and more increase its output power and therefore a high output power also indicates the need for IF-measurements and thus the need for a handover.

The prior art reference TS 25 231 V0.3.0, technical specification: Third Generation Partnership Project (3GPP); Technical specification group (TSG), radio access network (RAN); working group 1 (WG 1); Physical Layer-Measurements in the IS 95 standard, dated June 1999 (hereinafter referred to as reference [1]) describes in particular in chapters 3., 4., 5.1.2 a number of conventional measurement trigger criteria. In the mobile communication system described in reference [1] both a network handover means HORM and a subscriber station handover means HORM monitor the performance of the radio-link (RL) and can request a handover. For example, the network handover means HORM monitors the down-link by measurement reports from the subscriber station MS. The network handover means HORM also monitors the traffic load. As explained above, a hand-over evaluated by a mobile station MS is called a mobile-evaluated hand-over, abbreviated MEHO. A hand-over evaluated by the network is called a network—evaluated hand-over, abbreviated NEHO. As indicated in FIG. 1, since the mobile station MS and the network control means RNC each comprise a handover HORM each can initiate a handover according to the triggering conditions which are respectively monitored. The four basic criteria during the monitoring in step ST11 in the prior art are the "base station traffic load exceeded" condition, the "distance limits exceeded" condition, the "pilot strength below a predetermined threshold" condition and the "power level exceeded" condition as will be explained below and as is described in the aforementioned reference [1].

Firstly, regarding the condition "base station traffic load exceeded", the network handover means HORM determines the necessity for a handover by monitoring loads at all base stations BS in the mobile communication system T1 and outputs the IF measurement signal IFTS in order to balance loads between all base stations, in order to achieve a higher traffic efficiency. For example, the network handover means HORM outputs the trigger signal in step ST13 whenever the load at a base station exceeds a predetermined load threshold.

Secondly, regarding the condition "distance limits exceeded" the subscriber handover means and/or the network handover menas HOM are adapted to determine the necessity for the handover on the basis of a supervision of the distance between a base station BS and the subscriber station MS. The distance between the relevant base station and the subscriber station can be determined in a synchronized system. Therefore, the trigger signal IFTS is output in step ST13 whenever the measured distance exceeds a predetermined distance.

Thirdly, regarding the condition "pilot strength below a predetermined threshold", the subscriber handover means and/or the network handover means are adapted to determine the necessity for a handover on the basis of a supervision of a measured pilot signal strength falling below a predetermined power threshold. As is illustrated in FIG. 3-1 and in FIG. 4-1, in modern mobile communication systems a data transmission between a base transceiver station RBS and a subscriber station MS is carried-out by transmitting data frames FR and the transmission frames FR consist of a control portion CP and a data portion DP. This is true for CDMA frames (FIG. 3-1) and TDMA frames in GSM (FIG. 4-1). The control portion CP consists at least of pilot symbols PS and preferably also of other control symbols CS. For example, each base station BS may transmit a pilot signal PS of constant power on the same frequency. The subscriber station MS can monitor the received power level of the received pilot signal and can thus estimate the power loss on the connection between the base station BS and the subscriber station MS. Using the pilot signal strength for estimating the path loss, the subscriber handover means HORM outputs the trigger signal IFTS in step ST13 if the path loss is greater than a predetermined path loss threshold.

Fourthly, regarding the condition "power level exceeded" the subscriber handover means and/or the network handover means are adapted to determine the necessity for a handover on the basis of a supervision that in response to a power increase command by a base station BS a subscriber power adjustment module PAM (shown in FIG. 1 in the mobile station MS) is unable to further increase its power on the up-link of the communication connection CC.

FIGS. 5a–d show such a conventional adjustment of the transmission power when exchanging frames FR consisting of a number of time slots TS1 . . . TS15 between a base transceiver station (generally called node "B") RBS and a subscriber station MS. A power adjustment module PAM in the base transceiver station (node "B") RBS presets an upper threshold PUP, a lower threshold PDWN and an offset value POFF for the power. The power offset value POFF is used in connection with a slow power control and the upper and lower threshold values PUP, PDWN are used in connection with a fast power control in the node B.

The slower power control and the fast power control as illustrated in FIG. 5b is carried out according to the flow chart in FIG. 5c. Steps P1, P2 relate to the slow power control (the outer control loop) carried out on the RNC-side or the MS-side. In step P1 the frame error rate FER (or the block error rate BLER) is measured and in step P2 the measured FER (or the BLER) is compared with a FER target value (or a BLER target value). In step P8 a new signal interference ratio target value SIR-target is obtained. As shown in FIG. 5d, a known (simulated) relationship between a delta_SIR_target value (dB) and the logarithm of the measured FER value exists. Between two threshold values UL_delta_SIR_2 and UL_delta_SIR$_{13}$1 a predetermined "working area" exists. This relationship is known, i.e. simulated beforehand. As indicated in FIG. 5d, depending on the measured value log (measured FER) a value delta_SIR_target* is read out. A new SIR_target value SIR_target is calculated according to the following equation:

SIR_target=SIR_target+delta_SIR_target*

Thus, the outer loop or slow power control will generate in step P8 new SIR-target values whenever steps P1, P2 are executed. The new SIR-target value is then used in the fast power control (inner loop) carried out on the node B-side or the MS-side, respectively.

In step P5 the SIR (Signal-to-Interference ratio) per slot is measured and in step P4 the measured SIR value is compared with the (current) SIR-target value as obtained in step P8. If the measured SIR value is greater than the current SIR-target value, then a decrease command is sent to the mobile station MS/network, i.e. the transmission power control parameter TPC is set to TPC="00" in step P7. When the measured SIR value is smaller then the (current) SIR-target value in step P4, then an increase command is sent to the mobile station MS/network in step P6 by setting the transmission power control parameter TPC to TPC="11".

As illustrated in FIG. 5b, the slow power control and the fast power control result in a stepwise adjustment of the power $P_{out}$ on the downlink DL. Since the slow power control performs steps P1, P2 for calculating the frame error rate FER (or block error rate BLER) for every frame (or block) a new SIR-target value is obtained less frequently than the fast power control carried out with steps P5, P4, P6, P7 for each slot.

The offset value $P_{off}$ and the upper and lower threshold values $P_{up}$, $P_{dwn}$ are also used in the power adjustment. For example, when the output power $P_{out}$ exceeds the upper threshold $P_{up}$ then the offset value $P_{off}$ is slightly increased and when the power is lower than the lower threshold $P_{dwn}$ the offset value $P_{off}$ is slightly decreased. The stepwise adjustment of the power is always performed within the power range between $P_{dbn}$ and $P_{up}$. Since the values $P_{off}$, $P_{up}$ and $P_{dwn}$ are only used for the triggering of a soft-handover, they are not of any further relevance for the present invention and any further descriptions thereof-are therefore omitted.

As explained above, in the fourth condition "power level exceeded" the node B (the base station BS) commands the subscriber station MS to increase its power and if the power adjustment module PAM in the node B notices that there is no further increase of power in response to a power increase command TCP, the network handover means HORM may request a measurement by issuing the IF trigger signal.

Regarding the above described four different conditions, there are a number of significant disadvantages and some of the four described conditions can not even be implemented in future wideband code division multiple access systems (WCDMA).

Whilst reference [1] relates to the IS-95 standard and describes a synchronized CDMA system, reference [2]: TS 25.201 V2.1.0, a third generation partnership project (3GPP); technical specification group (TSG); radio access network (RAN; working group 1 (WG1); physical layer-general description, dated June 1999, describes a non-synchronized WCDMA system, in particular the multiple access used therein. In a synchronized system like the one described in reference [1] either the base station BS or the subscriber station MS can still estimate the distance between them (second trigger condition). This is possible since the chip rate on the pilot channel and all channels are synchronized (locked) to a precise system clock. This is in reference [1] accomplished by using a global positioning system (GPS). However, due to multipath propagation delay and shadowing between the base station BS and the subscriber station MS, the estimated distance may be erroneous. Therefore, the second condition "distance limits exceeded" may not be very accurate.

In condition 3 "pilot strength below a predetermined threshold" the subscriber station MS must perform measurements for triggering IF measurements and thus for triggering a handover. These continuous measurements of the pilot signal strength may drastically reduce the lifetime of the battery of the subscribers station, since the subscriber station MS must perform an average filtering of the pilot channel during a predetermined measurement time. The decrease of the lifetime of the battery is to be avoided in all circumstances, since there are already a lot of measurements that must be performed by the subscriber station, e.g. the IF measurements on other frequencies when the IF measurement trigger signal IFTS has been issued. Furthermore, the subscriber station MS has to report the pilot signal strength measurements in some form over the air-interface to the base transceiver station RBS (node B) and to the network control means RNC and this will additionally increase the interference level on the up-link UL as well as the signaling load in the network. Therefore, a load estimation according to the first condition "base station traffic load" when used in connection with the third condition "pilot strength below a predetermined threshold" may cause more signalling due to the increased signaling in an air interface of the network.

Therefore, the major disadvantage of the prior art trigger mechanisms is that some of the conditions cannot be used in synchronized or non-synchronized systems, that the lifetime of the battery is reduced and that the interference level on the up-link UL as well as the signaling load in the network is increased. The present invention exactly addresses these problems.

Returning to FIG. 2, in response to an IF measurement trigger signal IFTS (generated by the subscriber handover means HORM or the network handover means HORM), the subscriber station will perform IF measurements in a given time interval in step ST21. As explained above, in order to perform a fast and reliable inter-frequency handover, it is advantageous to let the subscriber station MS perform signal quality measurements on a different frequency, e.g. in a target cell or in a different system, and to report these to the network control means RNC, such that the network control means RNC can base its handover decisions, as to which cell the subscriber station MS is to be handed over, on these reported signal quality measurements. As explained below, the performing of IF-measurements in the subscriber station MS is not a trivial task. For example, in CDMA and FDMA systems the receiver of the subscriber station MS is normally busy receiving information on the current frequency and thus some measurement time has to be created in some way in such systems in order to allow inter-frequency measurements without a drastic loss of data. Conventional methods for determining a time interval in which field measurements are carried out will be described below as reference to FIGS. 3-1, 3-2, FIGS. 4-1, 4-2 and FIG. 6.

As already discussed above with reference to FIG. 3-1, in a CDMA communication system the data communication is performed by exchanging data frames FR consisting of a plurality of time slots TS1 . . . TS15. Each time slot comprises a control portion CP and a data portion DP. As described in the aforementioned reference [2] and as also indicated with step ST21' in FIG. 3-2 and in FIG. 3-1, it also possible to carry out the data transmission in a compressed mode (also called slotted mode) in order to create some time for the IF measurement. For this purpose the network control means RNC comprises a compressed mode setting means CMSM in which the data contained in the data portion DP is compressed, i.e. concentrated to a smaller part of the frame, resulting in an idle time portion ITP. The subscriber station MS comprises a compressed mode determining means CMDM which determines i.e. realizes—being informed about the compressed mode of transmission via signalling or some information sent from the compressed mode setting means CMSM of the network control means RNC—the compressed mode of operation. If such a compressed mode of operation is detected, the subscriber station MS enters a compressed mode of operation and performs the IF measurements in the idle time IT in step ST21" in FIG. 3-2.

In a CDMA system such a concentration of information is achieved by reducing the processing gain G=chips/information bits=1/SF, e.g. by decreasing the spreading factor SF. Another possibility how the concentration of information can be achieved is by changing the channel coding scheme, e.g. from r=⅓ to r=½. Due to the compressed mode of operation a time interval IT is generated in which the IF measurements can be carried out by the IF measurement means IFMM in the subscribed station MS.

FIG. 4-1 and steps SC21''' and ST21'''' show another possibility of how a time interval can be provided in which the field measurements can be carried out. In a GSM system, a specific time slot FMS of a frame consisting of a plurality of TDMA time slots TS1 . . . TS-M is specified and the field measurements are carried-out in the portion FMP. That is, in a GSM system a predetermined field measurement slot is provided in which no data is sent from the network control means or the base station transmitter to the subscriber station MS.

A further approach how an idle time interval can be provided is described in reference [1] for the case when an inter-system handover should be carried-out. In this case, as illustrated in FIG. 6, the subscriber station MS does not perform any measurements on another system and instead the other system transmits a pseudo-noise PN sequence which is received by the subscriber station MS on the same frequency on which the subscriber station MS already communicates. When the power of this PN sequence exceeds a predetermined threshold during a predetermined time, compared to other PN sequences, an inter-system handover is carried-out.

As shown in FIG. 2 and in FIGS. 3-1, 4-1, the network control means RNC triggers the mobile station and step ST13 to perform the IF measurements and it will also indicate to the subscriber statin MS on which frequency belonging to a different cell or a different system said IF measurements are to be carried-out. The subscriber station SS will report the IF measurements back to the network control means RNC within a predetermined time. Then, in step ST22, the network control means RNC will determine whether a handover to the selected frequency (cell or different system) is possible. If it is not possible, because for example a too high interference is detected on the new frequency, the network control means selects a new target cell (frequency) in step ST23 and the IF measurements are repeated by the subscriber station MS in step ST21. Furthermore, the network control means RNC can order the subscriber station MS to perform a periodic search or a single search. Such a procedure is for example described in reference [1] for a synchronized communication system.

In some systems like CDMA 2000 the subscriber station MS not only reports the IF measurements back to the network control means, but it also indicates to the network control means RNC how long (time-wise) and when (the starting time) the subscriber station MS will be able for performing the desired IF measurements. If the network control means RNC has knowledge of the time-interval in which the subscriber station MS intends to perform the IF measurements, then the network control means RNC can make some provisions to compensate for data frames, which would be sent by the network control means RNC, but which the subscriber station MS would not process in the time interval in which it performs the IF measurements. That is, actually data frames will get lost in the time period in which the subscriber MS performs the field measurements unless further provisions are made.

One possibility is that the network control means RNC increases the power before or after the measurement time interval or the intervals. Since the error rate is always evaluated over a plurality of data frames, such an increase of power before and after the measurement time interval enables to keep the overall quality for error rate to an average level which will not exceed the requirements of an average error rate. On the other hand, a similar situation occurs on the side of the subscriber station MS, i.e. it will not be possible for the subscriber station MS to transmit data frames in the measurement time interval. Therefore, also the subscriber station MS may compensate possible unsent frames by increasing the power before and after the determined measurement time interval. Therefore, on the side of the subscriber station MS and on the side of the network control means RNC the quality of the received is increased. However, the above described procedures (which are generally used in CDMA 2000 and IS'95) for providing a given time interval in which the mobile station MS is to carry-out field measurements in step ST21, the PN sequence transmission and the compensation for erased frames by increasing the power, still exhibit some major drawbacks when implemented in the system as explained below.

In addition, the WCDMA procedure of carrying-out field measurements in connection with the compressed mode of operation has the following disadvantages, in particular for the system. If the spreading factor SF in the down link DL is reduced to provide the idle time interval IT in which the subscriber station MS is to perform the field measurements on other systems, the available channelization codes are reduced. That is, the hard capacity for the CDMA system is decreased.

On the other hand, if the channel coding rate is increased for a certain time period, a complicated code-rate apparatus must be implemented in the network control means RNC, since a CDMA system can carry services with different coding schemes and different interleaving depths on the same radio link.

Furthermore, the subscriber station MS has to increase its output power when measurements are performed due to the compressed mode operation, since the same data information is transmitted during a smaller time period, i.e. in the compressed data period. If the output power of the subscriber station MS and/or base transceiver station RBS would not be increased, the performance will be decreased. However, this requirement to increase the peak power of the subscriber station MS may imply a distance limitation if the subscriber station MS is already transmitting at its maximum output power. Furthermore, there is a higher risk to lose information, since the data field is not protected to the same extent when the coding rate is reduced.

The procedure to use a PN sequence transmission as shown in FIG. 6 has the following disadvantages. In this case, all other existing mobile communication systems have to be equipped with an apparatus which transmits a PN sequence which can be detected by the subscriber station MS. This will imply high costs for the operators (and thus for the end users). Moreover, the PN sequence used in the other mobile communication systems will interfere with the CDMA systems and will reduce the capacity as well as the quality of data transmission.

The last mentioned method of increasing the power before and after the measurement time interval has the disadvantage that there is a high risk that a loss of frames due to the measurement time interval will deteriorate the speech quality in situations where speech quality is already very low, when it is likely that the subscriber station MS wants to do an inter-frequency handover close to a cell border or when the cell (sector) exhibits a high load.

Summarizing the above disadvantages of providing a time interval for IF measurements according to the afore described prior art, such provisions of the measurement time interval will result in a decreased quality of service (e.g. due to loss of frames), require a complicated system modification (due to the incorporation of PN sequence generators), and will shorten the lifetime of the battery in the subscriber station MS (if the power is increased before and after the time interval).

SUMMARY OF THE INVENTION

As explained above, the above mentioned first to fourth conditions for triggering inter-frequency measurements in a mobile communication system are not generally applicable to all systems, i.e. to synchronized or non-synchronized systems. Furthermore, the lifetime of the battery is reduced. In addition, the interference level on the up-link as well as the overall signaling load in the network may be increased. The present invention aims at avoiding these disadvantages.

In particular, the object of the present invention is to provide a subscriber station, a network control means, a method and a mobile communication system in which the inter-frequency measurements carried out by the subscriber station can be triggered without a reduction of a battery consumption in the subscriber station and without increasing the signaling load in the network and the interference on the up-link connection.

This object is solved by a subscriber station (claim 1) of a mobile communication system, which comprises at least one base transceiver station and a network control means for establishing at least one communication connection with said subscriber station, including an inter-frequency IF measurement means adapted to perform IF measurements, characterized by said IF measurement means being adapted to perform said IF measurements in response to a network IF measurement trigger signal transmitted and generated by an IF handover means of said network control means in response to a quality measurement means determining that the transmission quality on the down-link of said communication connection drops under a predetermined quality measure.

This object is also solved by a method (claim 21) for triggering inter-frequency IF measurements in a subscriber station of a mobile communication system, which comprises at least one base transceiver station and a network control means for establishing at least one communication connection with said subscriber station, including an inter-frequency IF measurement means adapted to perform said IF measurements, characterized by the steps of monitoring in said network control means the transmission quality on the down-link of said communication connection; generating a network IF measurement trigger signal when said transmission quality drops under a predetermined quality measure and sending said generated network IF measurement trigger signal to said subscriber station; and performing said IF measurements by said IF measurement means in said subscriber station in response to said network IF measurement trigger signal.

This object is also solved by a mobile communication system (claim 37) comprising at least one subscriber station including an inter-frequency IF measurement means adapted to perform said IF measurements and at least one base transceiver station and a network control means for establishing at least one communication connection with said subscriber station, characterized by said network control means comprising a quality measurement means adapted to monitor the transmission quality on the down-link of said communication connection and a network IF handover means adapted to generate a network IF measurement trigger signal when said transmission quality drops under a predetermined quality measure and to send said generated network IF measurement trigger signal to said subscriber station, wherein said IF measurement means is adapted to perform said IF measurements in said subscriber station in response to said network IF measurement trigger signal.

This object is also solved by a network control means (claim 48) of a mobile communication system comprising at least one subscriber station including an inter-frequency measurement means adapted to perform said IF measurements and at least one base transceiver station for establishing at least one communication connection with said subscriber station, characterized by said network control means comprising a quality measurement means adapted to monitor the transmission quality on the down-link of said communication connection and a network IF handover means adapted to generate a network IF measurement trigger signal when said transmission quality drops under a predetermined quality measure and to send said generated network IF measurement trigger signal to said subscriber station, wherein and said IF measurement means is adapted to perform said IF measurements in said subscriber station in response to said network IF measurement trigger signal.

According to a first aspect of the invention the IF measurements carried out by an IF measurement means in the subscriber station are started in response to a network IF measurement trigger signal transmitted and generated from the network control means in response to a quality measurement means in the network determining that the transmission quality on the down-link of the communication connection drops under a predetermined quality measure.

According to a second aspect of the invention a power measurement means PWM in the network control means measures a tranmitted output power on down-link and the IF measurement trigger signal is generated, when the transmitted output power on the down-link exceeds a predetermined power of said value. However, advantageously also other parameters can be evaluated to detect a degradation of the transmission quality on the down-link.

According to a third aspect of the invention, the IF measurement trigger signal is generated by the network control means only if the transmitted output power measured on the down-link by the power measurement means exceeds said predetermined power of said value longer than a predetermined time interval. Preferably, the power measurement on the down-link is carried out within the slow and fast power control carried out between the network control means and the subscriber station when adjusting the transmission power.

According to a fourth aspect of the invention, if several communication connections are established between the network and the subscriber station, the network IF measurement trigger signal is generated when the quality measurement means determines that the transmission quality on all down-links DL of all said communication connections drops under a respective predetermined quality measure. As before the measure can be the measurement of power on the down-link.

According to a fifth aspect of the invention a subscriber IF handover means transmits a suibscriber IF measurement trigger signal or some measurements in some form over the air-interface to the network control means and the network handover means will only generate and transmit the network IF measurement signal, when the measurements in the subscriber IF measurement signal indicate the necessity for a handover and said quality measurement means determines that the transmission quality on the down-link of the communication connection has dropped under said predetermined quality meaure. That is, based on the down-link quality measurement performed by the network and other measurements from the subscriber station, the network can trigger the subscriber station to perform said IF measurements.

According to a sixth aspect of the invention the network control means performs down-link quality measurements on the down-link and receives additional information, for example the total up-link interference level from the network and the network control means only issues the network interfrequency trigger signal if all measurements and conditions indicate the need for IF measurements.

According to a seventh aspect of the invention the outputting of the network IF measurement signal can additionally be made dependent on the conditions "base station traffic load exceeded", "distance limits exceeded", "pilot strength below a predetermined threshold" and "power level exceeded" in addition to being dependent on the down-link quality measurements.

In all aforementioned aspects the subscriber station does not need to perform measurements for triggering an inter-frequency or inter-system handover. That is, all this is carried out autonomously in the network control means by monitoring the down-link quality on the down-link of the communication connection. Therefore, there will be no signaling over the air-interface and the subscriber station has no need to report any measurements to the network control means, which thus increases the lifetime of the battery.

Further advantageous embodiments and improvements of the invention may be taken from the dependent claims. Furthermore, the invention can comprise embodiments resulting from a combination of aspects and features which have been separately described and/or claimed in the description and/or the attached claims.

Hereinafter, embodiments of the invention will be described with reference to the attached drawings.

BRIEF DESCRIPTION OF THE DRAWINGS

FIG. 2 shows a flow chart for performing an inter-frequency and/or inter-system handover in the telecommunication system TELE shown in FIG. 1;

FIG. 3-1 shows the constitution of data frames and time slots when a compressed mode of operation is used;

FIG. 3-2 shows a flow chart similar to FIG. 2 when a compressed mode of operation is used as shown in FIG. 3-1;

FIG. 4-1 shows the provision of a field measurement time slot in a conventional TDMA mobile communication system such as GSM;

FIG. 4-2 shows a flow chart similar as in FIG. 3-2 for the case when IF measurements are carried out in a specific IF measurement time slot as shown in FIG. 4-1;

FIG. 5a shows a diagram illustrating a power adjustment procedure between a subsriber station MS and a node B (base transceiver station RBS) according to the prior art;

FIG. 5b shows the stepwise adjustment of the output power on the downlink DL;

Figures 1, 3:
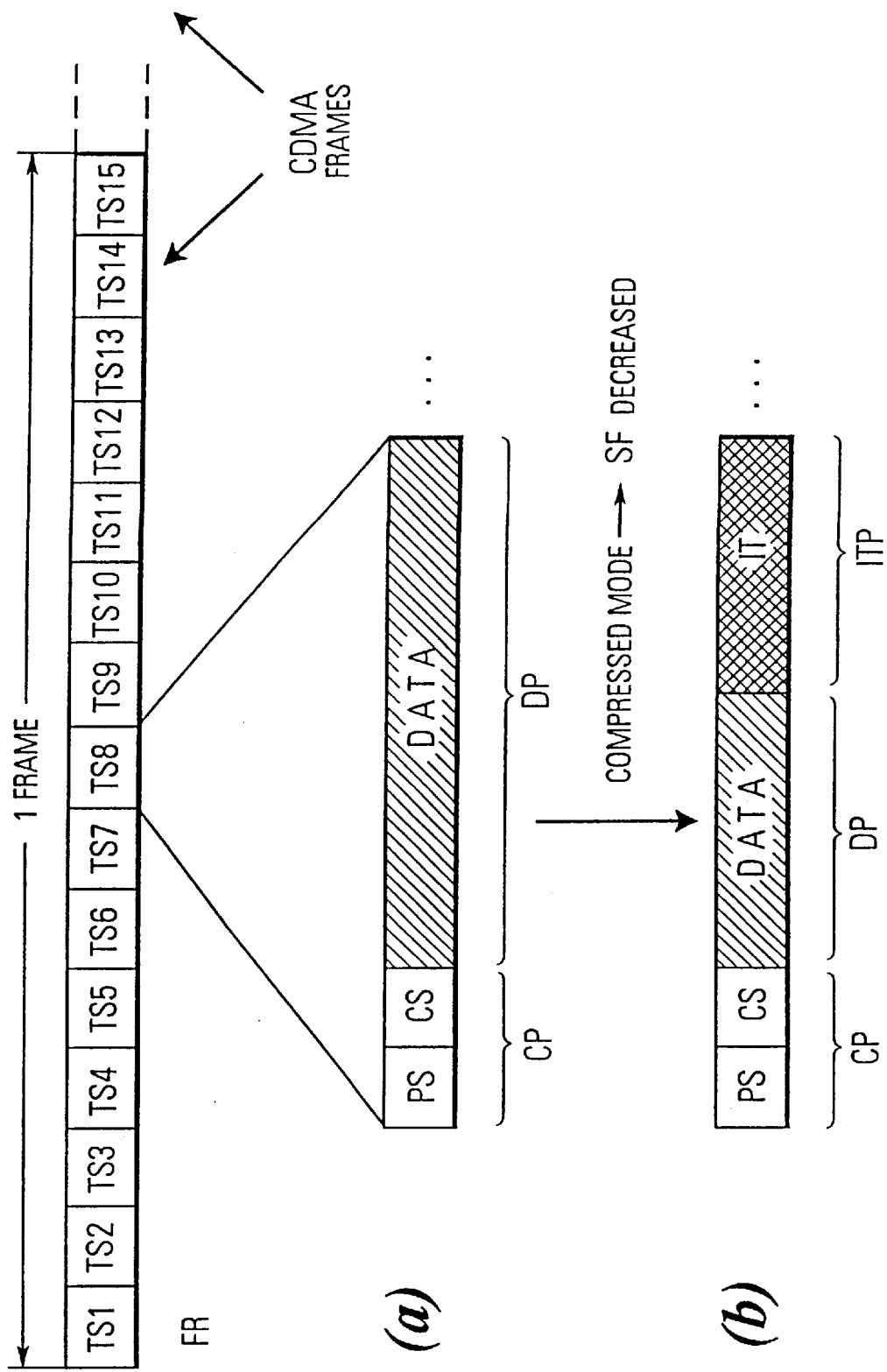
Figures 2, 3:
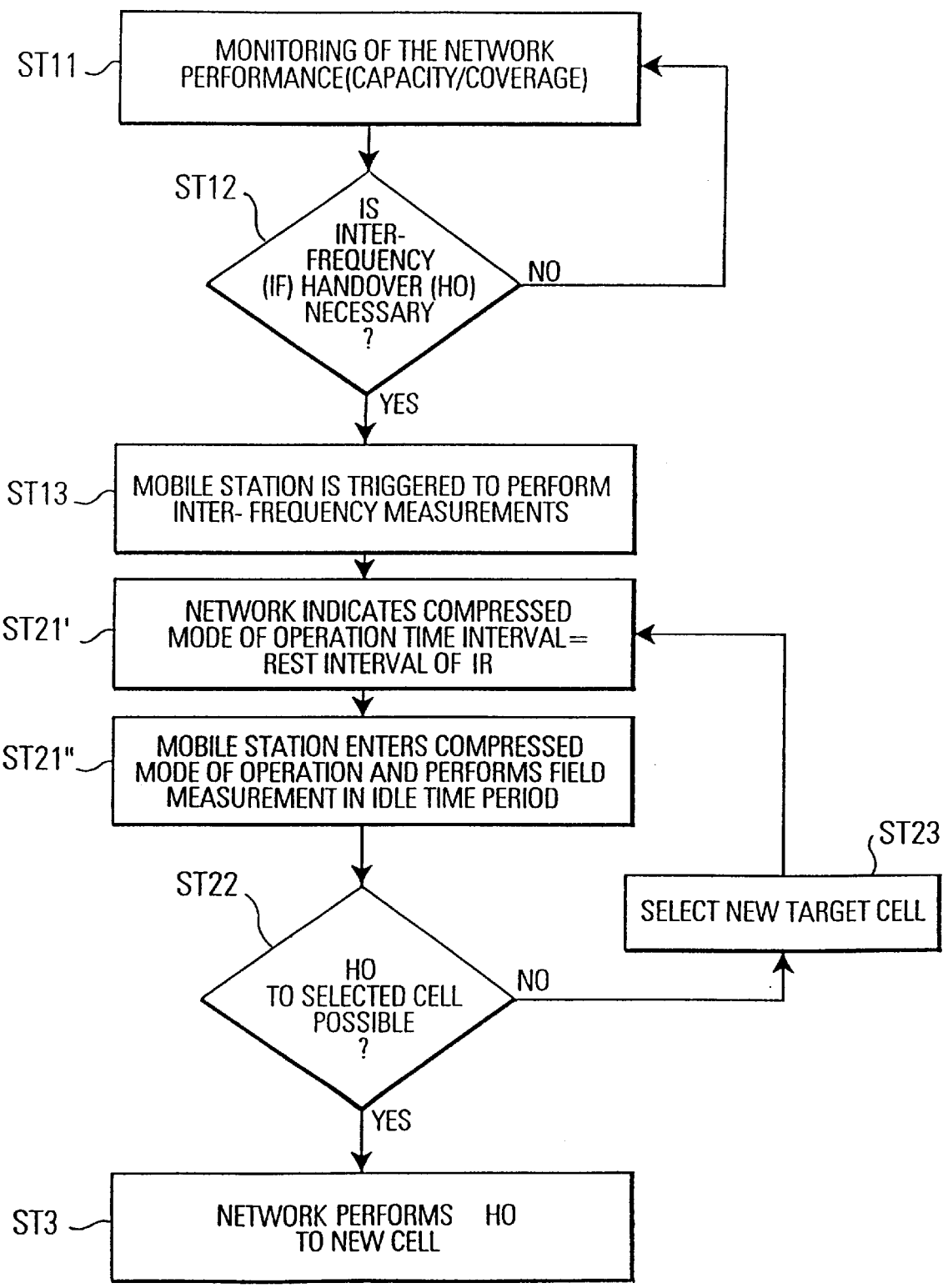
Figures 1, 4:
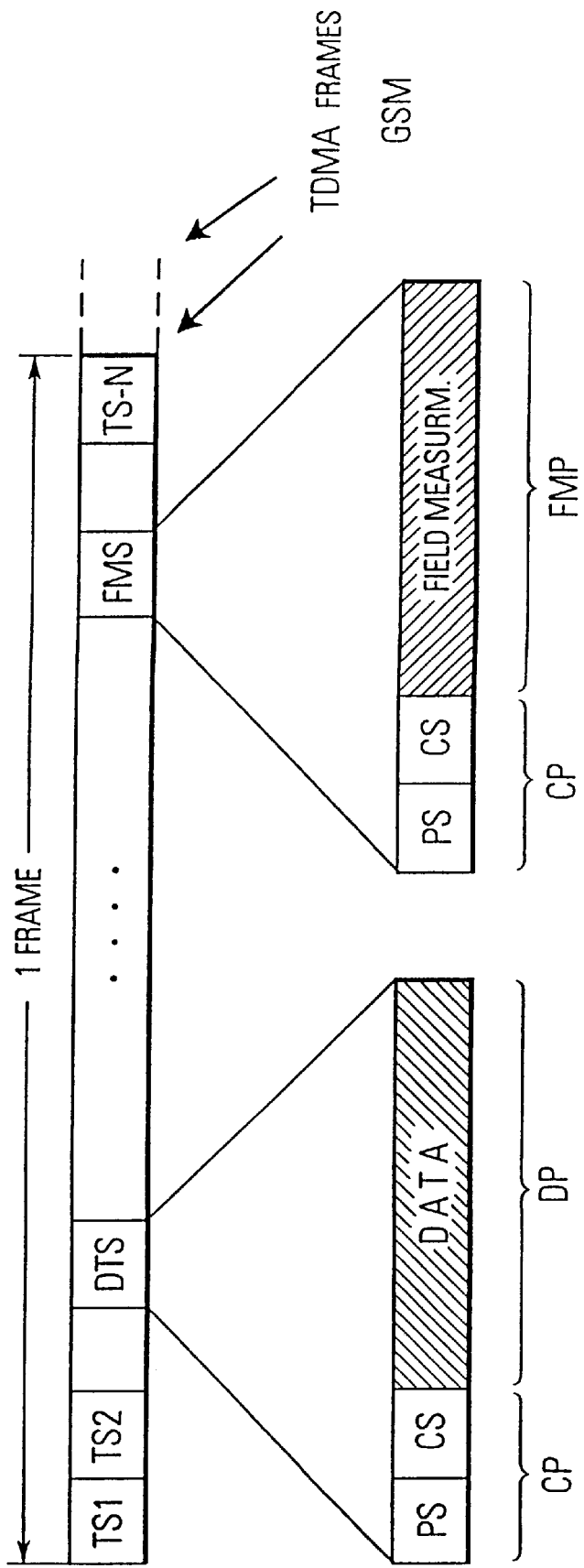
Figures 2, 4:
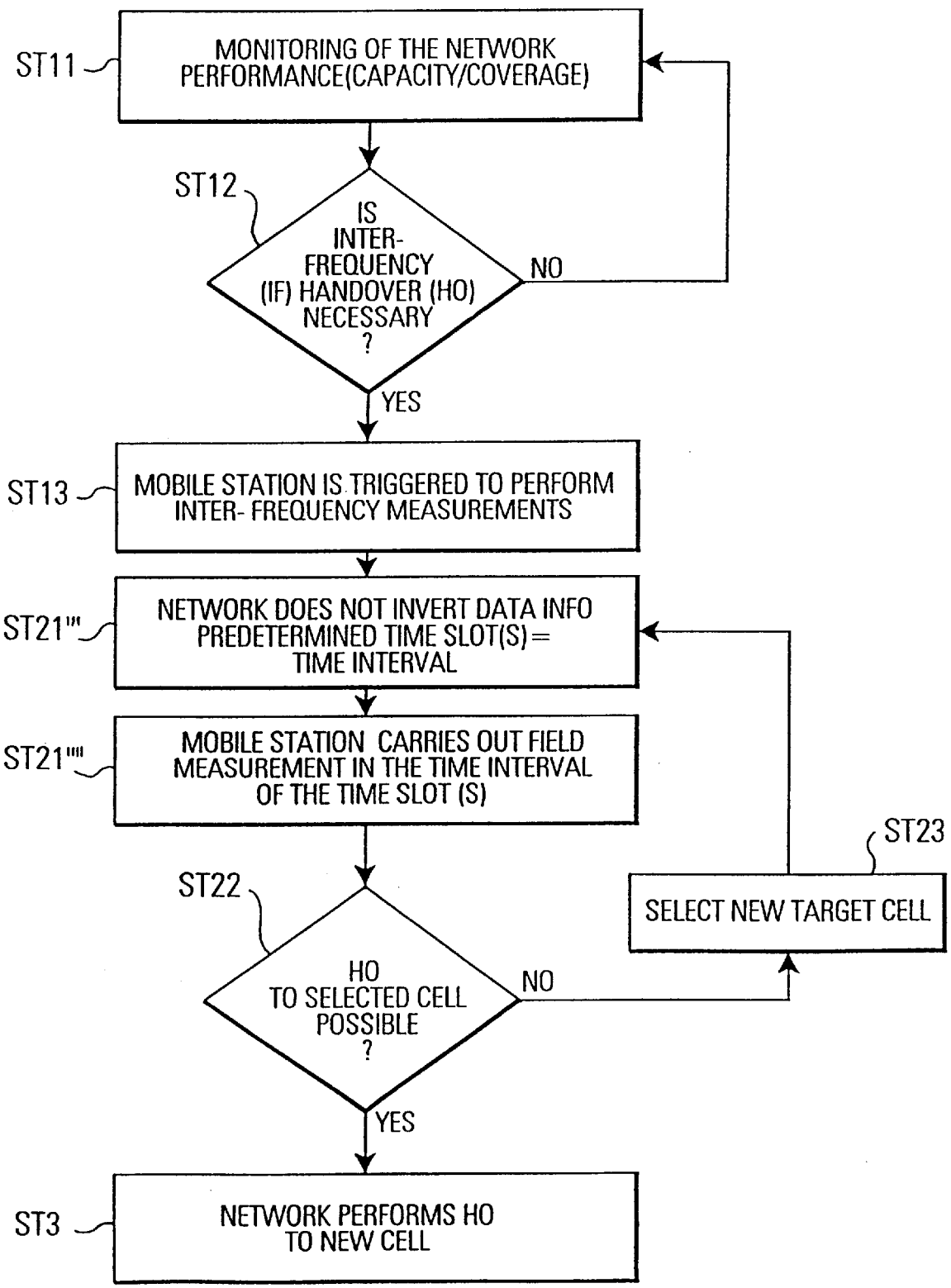

It should be noted that throughout the drawings the same or similar reference numerals designate the same or similar steps and features. In particular, the units described for a conventional subscriber station MS and a conventional network control means RNC in FIG. 2 are also present in the embodiments of the invention. Furthermore, it should be noted that the invention is not restricted to the specific CDMA, WCDMA, D-AMPS or GSM systems decribed above. That is, the invention can be applied to any telecommunications system where a handover needs to be performed between frequencies, cells and different systems.

PRINCIPLE OF THE INVENTION

It should be noted that the triggering of IF measurements in connection with handover procedures are carried in general in both cases when a communication connection CC is set up or when merely a signaling connection has been set up with the mobile station MS in a non-active mode of operation. That is, the need for a cell update may exist when the mobile station MS is merely registered in the network and does not initiate a call (or when no call is pending for the mobile station MS at the network control means).

Although hereinafter the quality measurement will be described with reference to the quality on a down-link of a communication conenction, it may be noted that a similar procedure can be used fot determining the quality on the down-link of a signalling communication, for example by monitoring the strength of a paging flag sent by the paging flag sending means PFM of the network control means. However, since one of the core aspects is that only the network control means carries out decisions regarding the triggering of the IF measurements, hereinafter it will be assumed that a communication connection has already been set up between the mobile station MS and the network control means RNC (radio network controller).

Figure 1:
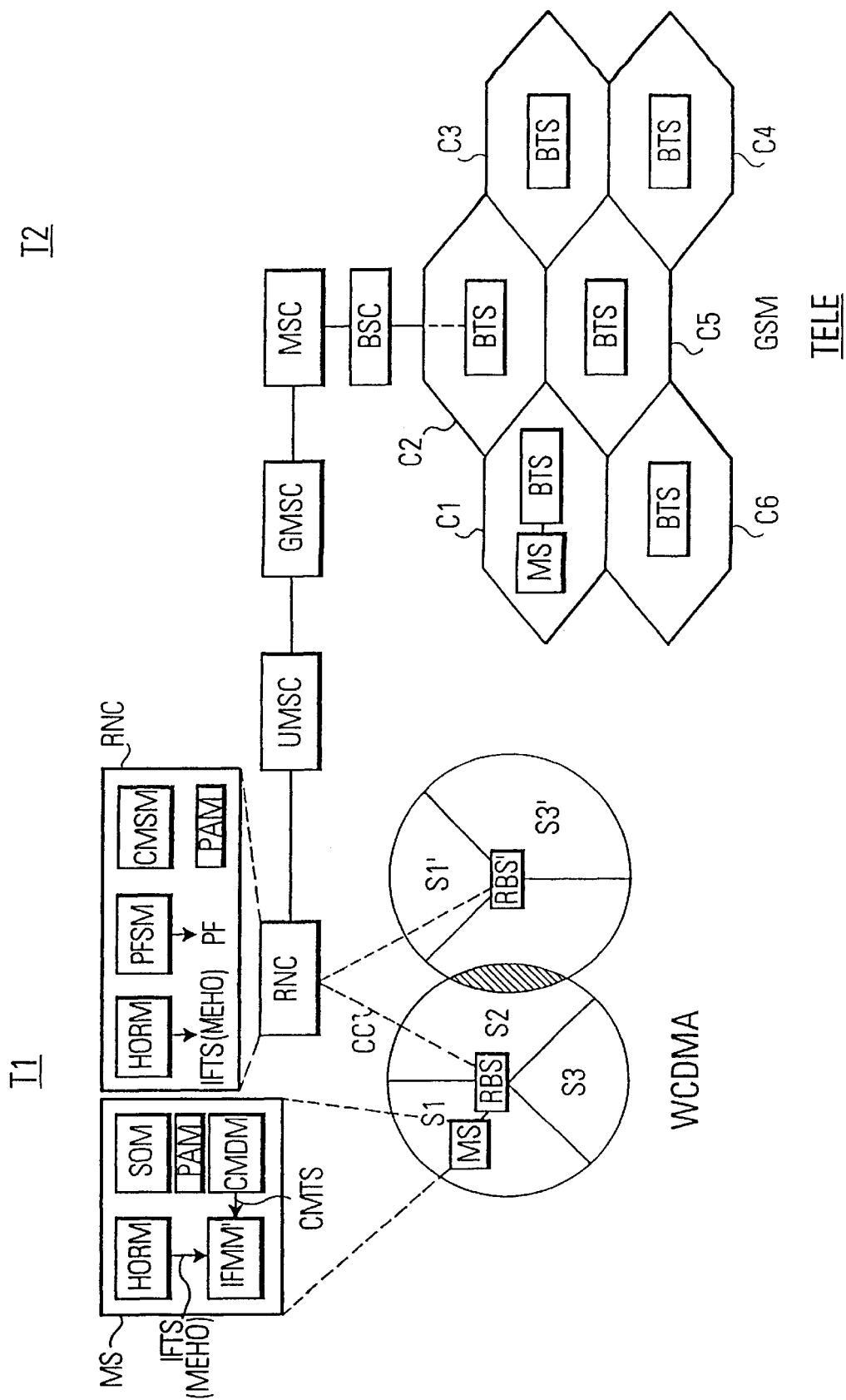
FIG. 1 shows a principal overview of a telecommunication system TELE comprising at least two different mobile communications systems T1, T2 according to the prior art.
Figure 7:
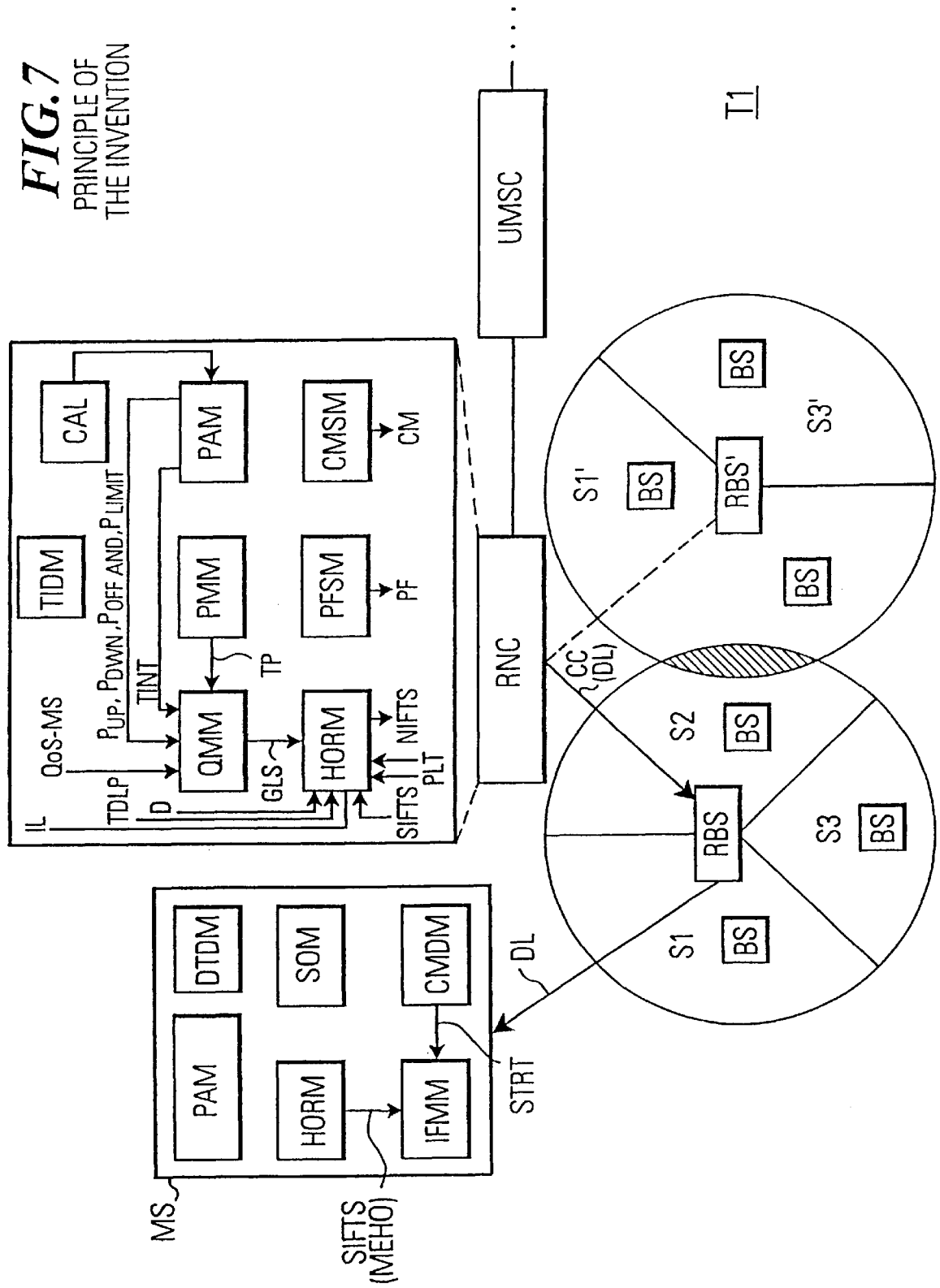
FIG. 7 shows a principle block diagram of a subscriber station MS and a network control means RNC according to the invention.

FIG. 7 shows a principle block diagram of a mobile communication system T1 according to the invention. In addition to the units already described in FIG. 1 according to the prior art, the network control means RNC comprises a quality measurement means QMM adapted to monitor the transmission quality on the down-link of the communication connection, a power measurement means PMM for measuring the transmitted output power on the downlink, a power control means PAM which generates the power offset value $P_{off}$, the upper threshold $P_{up}$, the lower threshold $P_{DWN}$ and a time interval signal TINT indicating a predetermined measurement interval and a power limit value $P_{limit}$. The power control means PAM may cooperate with a calibration means CAL for calibrating the values $P_{off}$, $P_{UP}$, $P_{DWN}$. Optionally, the network control means RNC contains a time interval determining means TIDM.

Figure 8:
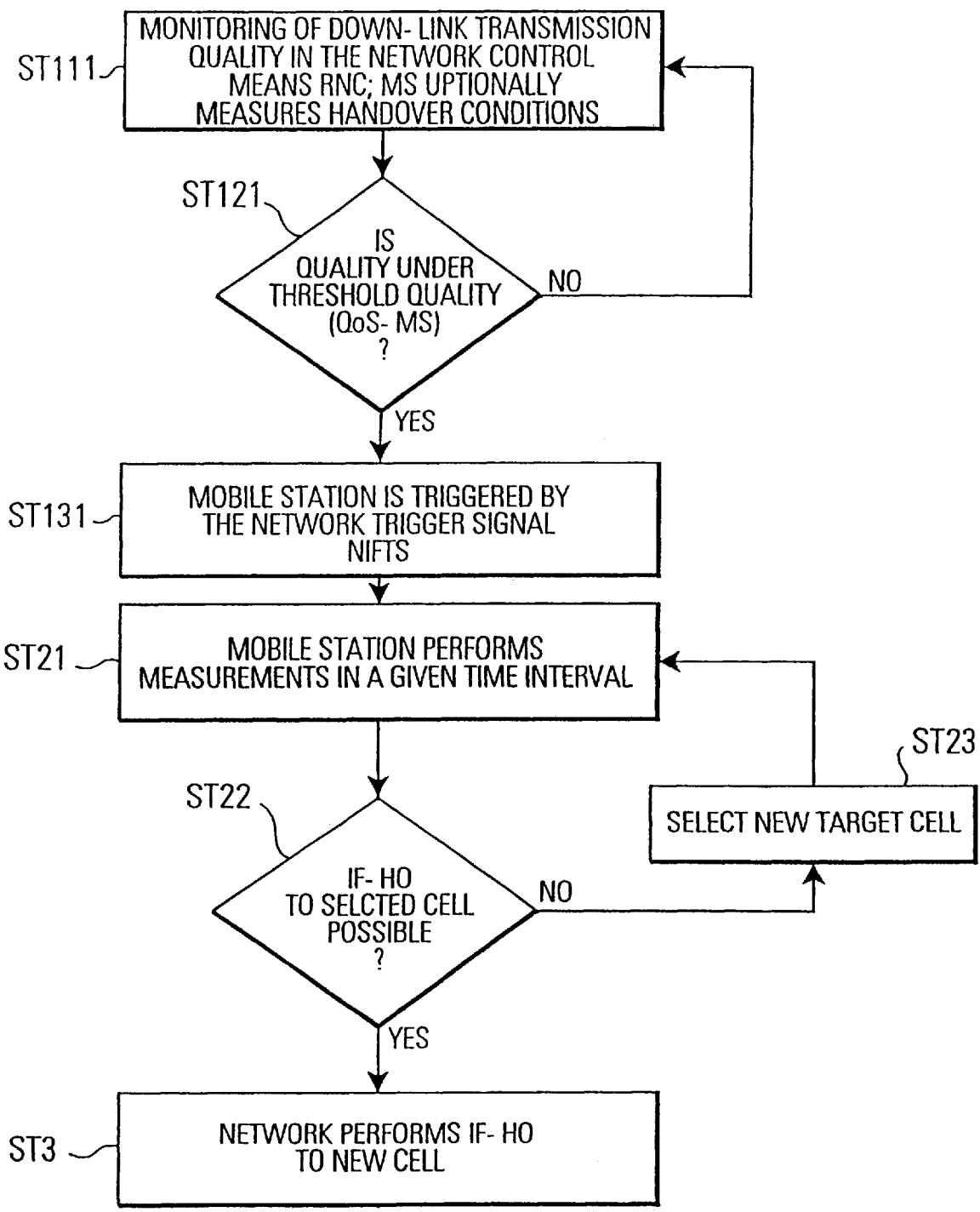
FIG. 8 shows a flow chart similar to FIG. 2, however incorporating a step ST111, ST121, ST131 according to the invention.

A shown in FIG. 8, the principal idea of the invention is that in said ST111 the quality measurement means QMM monitors the transmission quality on the down-link DL of the communication connection CC and the network IF handover means receives a quality signal QS from the quality measurement means QMM. This quality signal QS indicates to the network IF handover means HORM whether the determined transmission quality on the down-link is lower than a predetermined quality measure QoS-MS which is also supplied to the quality measurement means QMM (see FIG. 7).

If in step ST121 it is determined by the quality measurement means QMM that the detected down-link quality is under the threshold quality QoS-MS, than the quality signal QS will indicate this condition to the handover means HORM such that in step ST132 the handover means HORM outputs the network IF trigger signal IFTS. When the IF measurement means IFM in the subscriber station MS receives this trigger signal NIFTS, it will start performing IF measurements in said IF measurement means IFMM in step ST21 as aledy discussed with respect to FIG. 2 above. The other steps in FIG. 8 are the same as in FIG. 2.

As explained above, since only the network control means RNC (the quality measurement means QMM) must perform quality measurements on the down-link, the use of the subscriber station battery will be reduced and there is no additional interference in the up-link and the signaling load in the network is not increased since the subscriber station does not need to report the received signals strength to the network in order to trigger an inter-frequency or intersystem handover. That is, due to the inventive procedure for triggering the IF measurements, there will be no additional signaling over the air-interface.

Of course, according to the prior art, it is always easy to monitor the transmission quality in the subscriber station, i.e. by monitoring the strength of a pilot signal contained in a control portion of the transmission frame. However, in this case, as explained before, the subscriber station must report such measurements to the network control means RNC which thus increases the interference on the up-link of the communication connection CC and the overall load in the network. On the other hand, according to the principle of the invention, it was realized by the inventors, that in a typical WCDMA, CDMA, TDMA communication systems the quality of the down-link connection (which can be measured even from the network control side) can be used since the transmission conditions, even when they are measured on the network side, are a reflection of the current transmission conditions between the subscriber station MS and the network control means RNC. However, as explained before, this can be done completely autonomously by the network control means RNC.

Hereinafter several embodiments of the invention will be described with reference to the aspects how the quality can be measured on the down-link of the communication connection in order to output the network IF measurement signal NIFTS to the subscriber station MS.

FIRST EMBODIMENT OF THE INVENTION

Figure 5C:
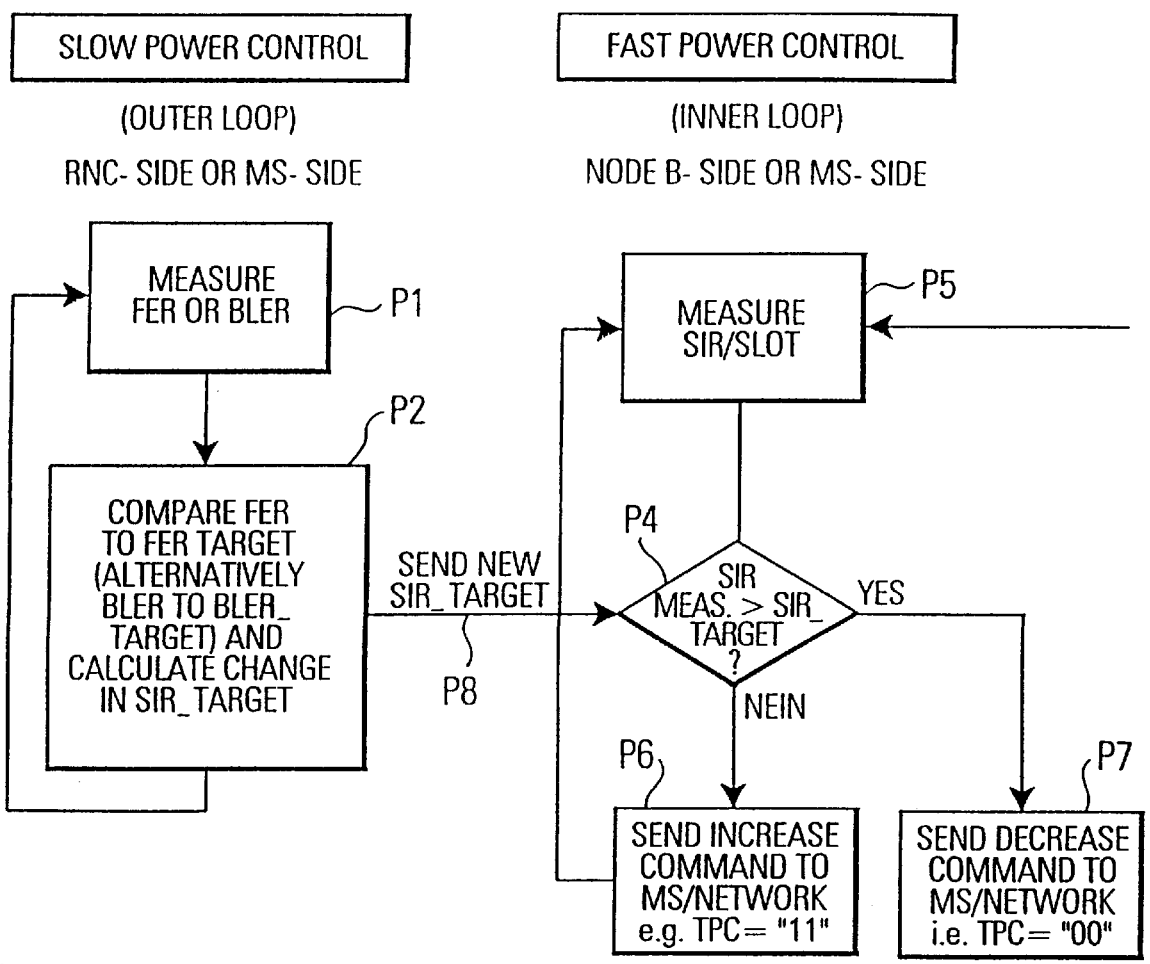
FIG. 5c shows a slow power control and a fast power control resulting in the stepwise change of the output power in FIG. 5b.
Figure 5D:
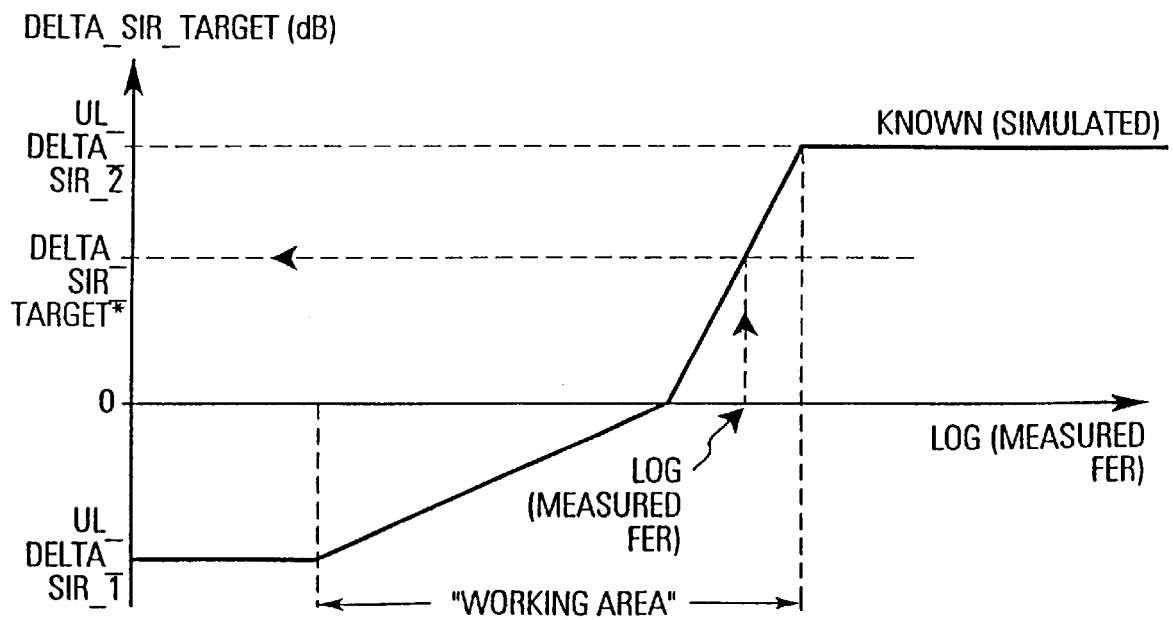
FIG. 5d shows the mapping of a measured frame error rate FER or block error rate BLER to a delta_SIR_target value.
Figure 6:
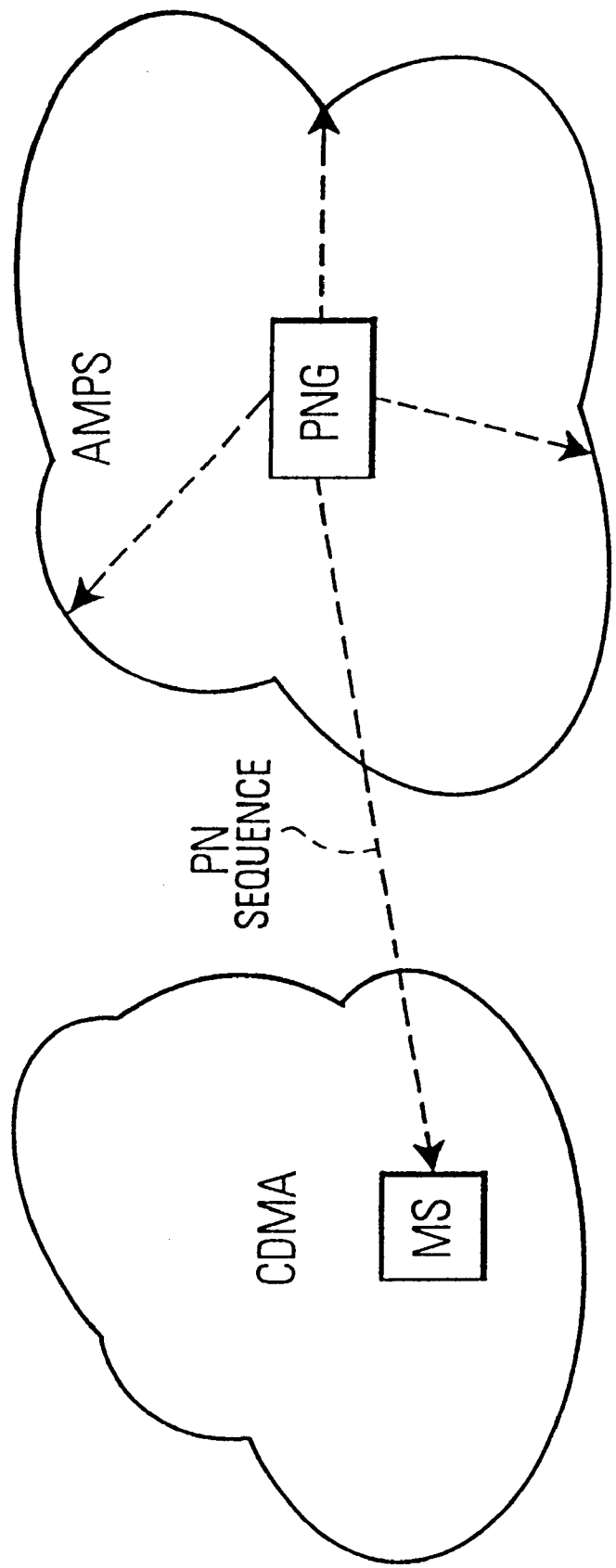
FIG. 6 shows a diagram for illustrating a handover procedure in connection with the transmission of PN sequences from a PN sequence generator PNG for inter-system handovers.
Figure 9:
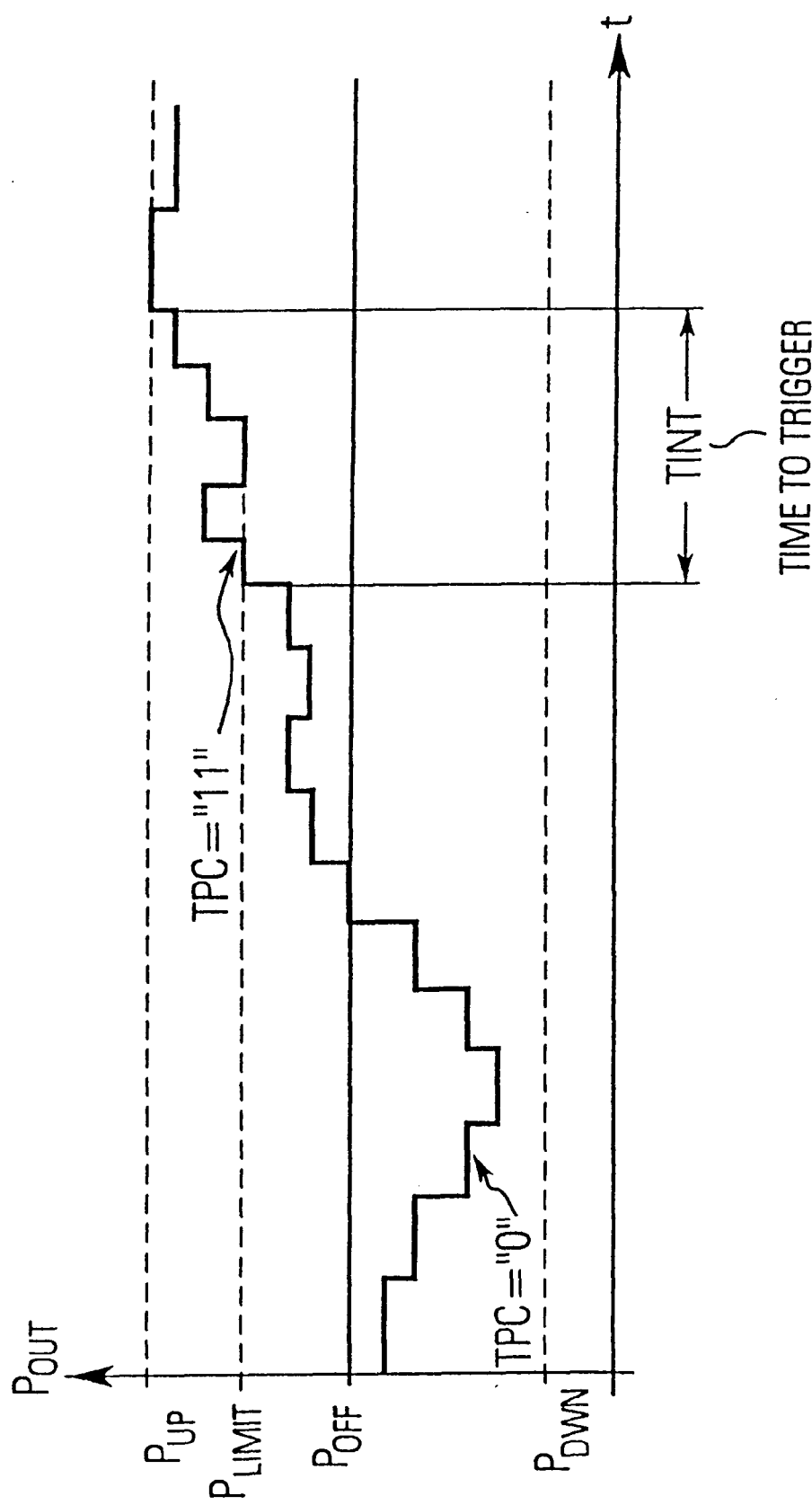
FIG. 9 shows a diagram similar to FIG. 5b where a power limit value $P_{limit}$ is used according to the invention.

According to a first aspect of the first embodiment of the invention the quality measurement comprises the measuring of the transmitted output power $P_{out}$ on the down-link DL from the network control means to the subscriber station. For example, the power measurement means PMM measures the transmitted output power $P_{out}$ on the down-link in step ST111 and the network IF measurement trigger signal NIFTS is generated in step ST131 by the network IF handover means HORM when the measured transmitted output power on the down-link preset by the power adjustment module. Therefore, the power measurement means PMM outputs a transmission power signal TP DL exceeds a predetermined power limit value $P_{limit}$ which is indicating the measured output power $P_{out}$ to the quality measurement means QMM and the predetermined power limit value $P_{limit}$ can for example be constituted by the quality measurement signal QoS-MS or it can be supplied to the quality measurement means QMM by the power adjustment module PAM as was explained above with reference to FIG. 5. FIG. 9 shows a diagram similar to FIG. 5b where this power limit value $P_{limit}$ is shown to be set preferably between $P_{off}$ and $P_{up}$.

According to another aspect of the first embodiment of the invention, the network IF measuement trigger signal NIFTS is only generated by the IF handover means if the measured transmitted output power on the down-link DL exceeds the predetemined power limit value $P_{limit}$ (e.g. contained in the QoS-MS signal) longer than a predetermined measurement interval TINT (this interval is also called the Time-To-Trigger interval). Such a predetermined measurement interval can be indicated to the quality measurement means QMM from the power adjustment module PAM or from the power measurement means PMM.

Typically the predetermined measurement interval TINT is a number of frames, for example in a CDMA system the predetermined measurement interval may be 10 to 100 frames. On the other hand, in a TDMA-system (e.g. a GSM-system) a predetermined measurement interval may be as long as 28 to 120 frames. In a WCDMA system the predetermined measurement interval TINT may be 10 to 20 frames.

It may also be noted that the aforementioned quality measurement procedure or power transmission measurement on the down-link can be performed for each of several communication connctions between one or several base stations BS and the subscriber station MS. In this case, the network IF measurement trigger signal NIFTS is generated by said network IF handover means HORM when the quality measurement QMM determines that the transmission quality on all down-links DL of all said communication connections CC drop under a predetermined quality measure. For example, the network IF measurement trigger signal NIFTS is generated when the transmitted output power on all down-links exceeds a predetermined threshold power or exceeds the power limit value $P_{limit}$ for a predetermined measurement interval. It is also possible to set different power limit values $P_{limit}$ and different predetermined measurement intervals TINT for the different communication connections.

As explained above, for the case of one or several communication links between the base transceiver station RBS and the subscriber station MS a predetermined power limit value $P_{limit}$ can be used against which the determined transmitted output power on the down-link DL is compared. Such a power limit value $P_{limit}$ can be the threshold value $P_{off}$ used in connection with a slow and fast power control as explained above with reference to FIG. 5.

As explained above, the power offset value $P_{off}$ can be dependent on a slow power control and said upper and lower power thresholds $P_{up}$; $P_{dwn}$ can be variable dependent on a fast power control respectively carried out by said power adjustment means PAM of said network control means RNC. Therefore, the offset power as well as the output power interval can be changed due to new conditions in the system. It should be noted, that the aforementioned power values are set for the down-link and present—when compared with the transmitted power—a measure of the transmission conditions on the down-link. However, since the power values are used in a slow and fast power control on the down-link, the power values are not exclusively dependent on the network side, but also incorporate effects on the subscriber station SS.

As shown in FIG. 7, the power adjustment means PAM may cooperate with a calibration means CAL for adjusting the power values. In particular, the calibration means CAL calibrates each power step within the range determined by the upper and lower power thresholds $P_{up}$, $P_{dwn}$ and said variable power offset values to predetermined (beforehand known) values.

SECOND EMBODIMENT OF THE INVENTION

As explained above, according to the first embodiment of the invention, down-link quality measurements (e.g. the transmitted power from the node B are performed by the network control means in order to output the network IF measurement trigger signal NIFTF. However, it is possible that the network handover means HORM outputs the trigger signal NIFTS also on the basis of some measurements performed in the subscriber station MS.

In this case, it is possible that the subscriber handover means HORM independently performs measurements regarding the need for handover and the IF measurement means IFMM only starts the IF measurements when the network trigger signal NIFTS as well the subscriber trigger signal SIFTS are generated.

On the other hand, it is also possible that the subscriber IF handover means HORM transmits the subscriber IF measurement trigger signal SIFTS to said network control means RNC. That is, the subscriber station SS transmits in the subscriber IF measurement trigger signal SIFTS measurements which have been performed on the side of the subscriber station. In this case, the network control means RNC also processes the subscriber trigger signal SIFTS (as shown in FIG. 7 with the input of SIFTS to the handover means HORM) and generates and transmits the network IF measurement signal NIFTS only when the measurements in the subscriber trigger signal SIFTS indicate the necessity for a handover and the quality measurement means determine that the transmission quality on the down link of said communication connection has dropped under said predetermined quality measure as discussed above.

Therefore, according to the second embodiment of the invention the network control means triggers the subscriber station MS to perform inter-frequency/inter-system measurements on the basis on the down link quality measurements performed by the network control means and other measurements performed in the subscriber station MS. This eventually results in a more acuarate generation of the trigger signal, although the measurements will have to be reported to the network control means on the up link UL and therefore the interference level on the up link UL is increased.

On the other hand, the network control means RNC already bases a part of the trigger signal generation on the down link quality and therefore only a small amount of additional information (subscriber measurements) need to be transmitted from the subscriber station to the network control means RNC. Therefore, the additional interference on the up link and the increase of the overall load in the communication system will be small. Typical measurements which can be carried out by the subscriber station MS are those described above with respect to the conventional four trigger conditions.

THIRD EMBODIMENT OF THE INVENTION

According to a third embodiment of the invention, the network control means RNC generates the network IF measurement trigger signal NIFTS if the measurements reported in the subscriber IF measurement trigger signal SIFTS from the subscriber station MS indicate the need for a handover (as in the second embodiment) if said quality measurement means QMM determines that the transmission quality on the down link DL of said communication connection has dropped under said predetermined quality threshold (as in the first and second embodiments) and if in addition additional system information IL; TDLP provided in the network control means RNC also indicate handover.

That is, according to the third embodiment the network trigger signal NIFTS is generated based on the down link quality measurements performed by the quality measurement means QMM, additional system information as well as other measurements from the subscriber station. Preferably, such additional system information can be the total up link interference level IL of the communication connection CC between the subscriber station SS and the network control means RNC or the base transceiver station RBS and/or the total down link output power TDLP (in FIG. 7 these parameters are shown as input to the handover means HORM). If the quality measurements, the additional system information and the subscriber station measurements indicate the need for a handover, the network control means RNC according to the third embodiment of the invention triggers the subscriber station MS to perform inter-frequency/inter-system measurements.

FOURTH EMBODIMENT OF THE INVENTION

As explained above, according to the principle of the invention the quality of the transmission conditions on the down link is used as a measure for triggering the subscriber station to perform IF measurements. According to the first embodiment of the invention such a quality measure is constituted by the transmitted output power on the down link.

According to the second and third embodiments of the invention additional information is used for generating the trigger signal in the network control means. The additional information provided in the network control means RNC may be the total up link interference level IL of the communication connection CC and/or the total down link output power TDLP. In the simplest case, the measurements carried out in the subscriber station MS can be an average filtering of a pilot channel during a predetermined time.

However, other conventional criteria as explained above with reference to FIGS. 1–5 may be used in the embodiments of the invention.

For example, the additional information provided in the network controls means RNC may relate to the "base station traffic load" referred to as first condition above. That is, the network IF handover means HORM may determine the necessity for handover also on the basis of a supervision of the loads at all base stations RBS in the network.

Furthermore, regarding the measurements in the subscriber station and the additional system information, the subscriber handover means HORM and/or the network handover means HORM can determine the necessity for handover additionally also on the basis of a supervision of the distance D between a base station RBS and the subscriber station MS which has been referred to above as the second condition "a distance limits exceeded".

Furthermore, the network trigger signal NIFTS can also be generated additionally on the basis of the third condition "pilot strength below a predetermined threshold". In this case, in addition to the determining of the down link quality, the trigger signal NIFTS is generated, when the subscriber IF handover means HORM and/or said network IF handover means HORM determine the necessity for a handover on the basis of a supervision of a measured pilot signal strength PLT (as shown as input to the network handover means HORM in FIG. 7). The trigger signal is only generated, when the quality on the down link drops below a predetermined measure and if the measured pilot signal strength falls below a predetermined power threshold.

Furthermore, it is also possible that the subscriber handover means HORM and/or the network handover means HORM determine the necessity for a handover on the basis of an output by a network supervision means PAM that in response to a power increase command by a base station BS a subscriber station power adjustment module PAM is unable to further increase the power on the up link of said communication connection CC. This additional condition has been referred to as the fourth condition "power level exceeded" above.

Such additional decision criteria determined in the subscriber station and/or the network control means RNC can be used in connection with the principle of the invention and in connection with the first, second and third embodiments.

Furthermore, it should be noted that a skilled person can devise other criteria for determining the down link quality and that the determination of the down link on the basis of the evaluation of the down link transmitted power is only one of the methods how the quality on the down link can be determined. Other measures like the bit error rate or the interference level on the down link may also be used. The common aspect amongst all these quality measurement procedures is that they can be carried out autonomously in the network control means without needing additional information from the subscriber station. That is, all information in addition to the down link quality measurement (such as network internal information or measurements transmitted from the subscriber station) are only used additionally to make the trigger signal generation even more accurate.

ADDITIONAL EMBODIMENTS OF THE INVENTION

As explained above with reference to FIG. 2, after having been triggered the IF measurement means IFMM in the mobile station MS carries out the field measurements in step ST21 in a given time interval. Such a time interval may start immediately after receipt of the network trigger signal NIFTS in the subscriber station MS. However, there may also be a delay after receipt of the trigger signal because a suitable time interval has not been determined as yet or a determined time interval has not started. However, the determination of the time interval mentioned in these two patent applications can be used in connection with the generation of the trigger signal as described in the present application. Therefore, the content of these two European applications are incorporated into the present application via reference.

Briefly summarized, the following possibilities exist for a suitable determination of the field measurement time interval. The subscriber station MS can contain a data transmission determining means DTDM adapted to determine a predetermined time interval in which a base transceiver station RBS will not direct to a said subscriber station MS a data transmission, wherein said IF measurement means IFMM is adapted to perform said IF measurements in said predetermined time interval after said network IF measurement trigger signal is received.

One example how the data transmission determing means DTDM can determine this time interval is by determining the power ratio of the information contained in the data portion DP to the information contained in the control portion CP of one or more data transmission frames FR. A power estimation means is adapted to determine that no data transmission will take place in a time interval corresponding to a predetermined number of data slots following the output of said IF measurement trigger signal if said power ratio is below a predetermined power ratio in one or more data slots or data frames.

That is, in this case some time slots or data frames after receipt of the trigger-signal will be evaluated such that the time interval in which the measurements are carried out will start a little later than the receipt of the trigger signals.

If only a signalling communication exists between the subscriber station MS and the network control means RNC then it is also possible to monitor the transmission of a paging flag in the subscriber station MS. If no paging flag is transmitted then the subscriber station MS judges that the network is not about to perform a data transmission. Therefore, at each time point where the signalling communication is monitored and no paging flag is detected, the subscriber station sets a predetermined number of time slots or data frames as the predetermined time interval.

In this case, it is also possible that the IF measurements carried out in the subscriber station are not only carried out in the predetermined time interval, but also in a idle time interval IT of a data frame FR when the transmission between the network and the subscriber station MS is carried out in a compressed mode of operation. In this case, carrying out data transmission in said compressed mode after receiving the network trigger signal, the predetermined time interval used for the IF measurements corresponds to a number of data slots or frames where no data transmission takes place (as determined by the data transmission determining means DTDM) and a number of idle time portions of data frames or slots where data transmission is carried in a compressed mode.

Whilst in the aforementioned examples the time interval is determined by the subscriber station after receiving the trigger signal from the network, it is also possible that the network control means ifself transmits an indication to the subscriber station about the time interval which should be used for the IF measurements.

In particular, the network IF measurement trigger signal NIFTS or a further control signal from the network control means RNC can indicate the time interval in which said subscriber station is to carry out said IF measurements. Since the trigger signal needs to be sent to the subscriber station MS in order to trigger the subscriber station MS, it is advantageous to contain the indication of the time interval in the trigger signal such that the subscriber station MS is immediately informed—together with the triggering—about the time interval which should be used for the IF measurements.

The network control means RNC can autonomously determine the time interval to be used for the IF measurements as a time interval in which a temporary degradation of the transmission conditions between the subscriber station MS and the base transceiver station RBS is determined as acceptable. Such a temporary reduction of the quality of service may be determined because of a deletion of data during a delay-sensitive data transmission between the subscriber station MS and the base transceiver station RBS. If such a deletion is necessary, then the subscriber MS and the network control means RNC will respectively increase a transmission power on the down link DL and the up link UL on the communication connection before the beginning of said predetermined time interval and/or after the end of said predetermined time interval.

Since the first embodiment of the present invention already monitors the transmitted power on the down link in order to generate the trigger signal, this can be advantageously coupled with the determination of the time interval on the basis of a temporary reduction of the quality of transmission, since the network control means RNC can combine the measurement of the transmitted power for generating the trigger signal with the determination of the time interval.

INDUSTRIAL APPLICABILITY

As explained above, the generation of the trigger signal according to the present invention can be applied to any mobile communication system comprising at least one communication network, independent of the transmission standard used. Therefore, the present invention can be used in the context of GSM, PDS, TACS or D-AMPS systems or combinations of two or more of the systems. Of course, if a handover to a system with a different standard is required, the subscriber station MS as described above will be able to operate according to both standards (e.g. dual-mode-operation).

Furthermore, it should be noted that what has been described above is what the inventors currently perceive as the best mode of the invention. However, of course further modifications and variations of the invention are possible on the basis of the teaching herein and the presented disclosure. As explained above, the invention may comprise embodiments which result from a combination of features which have been separately described in the description and claimed in the claims.

Reference numerals in the claims only serve clarification purposes and do not limit the scope of protection.

What is claimed is:

1. A subscriber station of a mobile communication system having at least one base transceiver station and a network control unit operable to establish at least one communication connection with said subscriber station, said subscriber station comprising:
   an inter-frequency measurement unit operable to perform inter-frequency measurements;
   a network inter-frequency measurement trigger signal transmitted and generated by a network handover unit of said network control unit; and
   a quality measurement unit determining that the transmission quality on a down-link of said at least one communication connection drops below a predetermined quality measure, said inter-frequency measurement unit performing said inter-frequency measurements in response to reception of said network inter-frequency measurement trigger signal, said inter-frequency measurement trigger signal generated and transmitted in response to said transmission quality dropping below said predetermined quality measure.

2. The subscriber station according to claim 1, wherein said network inter-frequency measurement trigger signal indicates that a transmitted output power measured on the down-link by a power measurement unit exceeds a predetermined power limit value.

3. The subscriber station according to claim 2, wherein said network inter-frequency measurement trigger signal indicates that said transmitted output power measured on the down-link by said power measurement unit exceeds said predetermined power limit value at least for a predetermined measurement interval.

4. The subscriber station according to claim 2, further comprising a power adjustment unit operable to preset at least one of a predetermined power offset value, an upper threshold value and a lower threshold value for the downlink within which said measured down-link power is allowed to vary.

5. The subscriber station according to claim 4, wherein said power offset value is dependent on a slow power control, said upper and lower threshold values are dependent on a fast power control, said slow power control and said fast power control carried out by said network control unit including a calibration unit operable to calibrate at least one power step to predetermined values within a range determined by the upper and lower threshold values and said power offset value.

6. The subscriber station according to claim 1, wherein at least two communication connections are established between a plurality of base station transceivers and said subscriber station, said network inter-frequency measurement trigger signal generated by said network handover unit when said quality measurement unit determines that the transmission quality on all down-links of all said communication connections drops below a respective predetermined quality measure.

7. The subscriber station according to claim 1, further comprising a subscriber handover unit operable to perform measurements made within said subscriber station for generating a subscriber inter-frequency measurement trigger signal, said inter-frequency measurement unit operable to start said inter-frequency measurements when said network trigger signal and said subscriber trigger signal are generated.

8. The subscriber station according to claim 7, wherein said subscriber handover unit transmits to said network control unit said subscriber inter-frequency measurement trigger signal, said network handover unit generates and transmits said network inter-frequency measurement signal when said measurements in said subscriber inter-frequency measurement trigger signal indicate the necessity for a handover and said quality measurement unit determines that the transmission quality on the down-link of said at least one communication connection has dropped below said predetermined quality threshold.

9. The subscriber station according to claim 8, wherein said network inter-frequency measurement trigger signal is generated when said measurements made within said subscriber station and reported in said subscriber inter-frequency measurement trigger signal from said subscriber station indicate a handover, said quality measurement unit determines that the transmission quality on the down-link of said at least one communication connection has dropped below said predetermined quality threshold, and system information provided in the network control unit indicates a handover.

10. The subscriber station according to claim 7, wherein said subscriber handover unit is operable to perform measurements by an average filtering of a pilot channel during a predetermined time.

11. The subscriber station according to claim 9, wherein said system information includes at least one of a total uplink interference level of the communication connection and a total down-link output power.

12. The subscriber station according to claim 7, wherein said network handover unit is operable to determine the necessity for a handover on the basis of a supervision of loads at all of said at least one base transceiver stations in the communication system.

13. The subscriber station according to claim 7, wherein at least one of said subscriber handover unit and said network handover unit are operable to determine the necessity for a handover on the basis of a supervision of the distance between said at least one base transceiver station and the subscriber station.

14. The subscriber station according to claim 7, wherein at least one of said subscriber handover unit and said network handover unit are operable to determine the necessity for a handover on the basis of a supervision of a measured pilot signal strength falling below a predetermined power threshold.

15. The subscriber station according to claim 7, further comprising a subscriber station power adjustment module, at least one of said subscriber handover unit and said network handover unit operable to determine the necessity for a handover on the basis of said subscriber station power adjustment module failing to further increase its power on an uplink of said at least one communication connection in response to a power increase command by at least one of said base transceiver station.

16. The subscriber station according to claim 1, further comprising:
a data transmission determining unit operable to determine a predetermined time interval in which said at least one base transceiver station will not direct to said subscriber station a data transmission, said inter-frequency measurement unit operable to perform said inter-frequency measurements in a predetermined time interval after said network inter-frequency measurement trigger signal is received.

17. The subscriber station according to claim 16, wherein a transmission of data is carried out on said at least one communication connection via at least one transmission frame including a control portion and a data portion, said data transmission determining unit operable to determine a power ratio of the information contained in the data portion to the information contained in the control portion, said data transmission determining unit including a power estimation unit operable to determine that no data transmission will take place in a time interval corresponding to a predetermined number of data slots following the output of said inter-frequency measurement trigger signal if said power ratio is below a predefined power ratio.

18. The subscriber station according to claim 16, further comprising:
a non-active mode operation unit operable to hold the subscriber station in a non-active operation mode in which at least a signalling communication is established between said subscriber station and said at least one base transceiver station; and
a paging flag monitoring unit operable to monitor a transmission of a paging flag from said at least one base transceiver station to said subscriber station, said paging flag monitoring unit operable to determine that no transmission of said paging flag has been made, said data transmission determining unit operable to determine that a data transmission will not take place in a time interval corresponding to a predetermined number of data slots after detecting said paging flag.

19. The subscriber station according to claim 17, further comprising a compression-mode detection unit, said data transmission between said subscriber station and said at least one base transceiver station occurring in a compressed mode by compression of said data transmission in said data portion in at least one time slot such that an idle time interval is provided in said time slot where no data transmission occurs, said compression-mode detection unit operable to detect data transmission in said compressed mode, said predetermined time interval corresponding to a plurality of data slots where no data transmission takes place and a number of idle time portions of data slots where data transmission is made in a compressed mode.

20. The subscriber station according to claim 1, wherein at least one of said network inter-frequency measurement trigger signal and a control signal from the network control unit indicates a time interval in which said subscriber station is to carry out said inter-frequency measurements.

21. A method for triggering inter-frequency measurements in a subscriber station of a mobile communication system including at least one base transceiver station and a network control unit operable to establish at least one communication connection with said subscriber station, said subscriber station including an inter-frequency measurement unit operable to perform said inter-frequency measurements, said method comprising the steps of:

monitoring, in said network control unit, the transmission quality on a down-link of said at least one communication connection;

generating a network inter-frequency measurement trigger signal when said transmission quality drops below a predetermined quality measure;

sending said generated network inter-frequency measurement trigger signal to said subscriber station; and performing said inter-frequency measurements by said inter-frequency measurement unit in said subscriber station in response to said network inter-frequency measurement trigger signal.

22. The method according to claim 21, further comprising the step of measuring a transmitted output power on the down-link by a power measurement unit, said generating step occurring when said transmitted output power on the down-link exceeds a predetermined power limit value.

23. The method according to claim 22, wherein said step of generating occurs when said transmitted output power measured on the down-link by said power measurement unit exceeds said predetermined power offset value longer than a predetermined measurement interval.

24. The method according to claim 22, further comprising the step of presetting, by a quality measurement unit, said predetermined power offset value, an upper threshold value and a lower threshold value within which said measured down-link power is allowed to vary.

25. The method according to claim 24, wherein said power offset value is dependent on a slow power control, said upper and lower power thresholds are variable dependent on a fast power control, said slow power control and said fast power control carried out by a power adjustment unit of said network control unit, a calibration unit calibrating each power step within a range determined by the upper and lower thresholds and said power offset value to predetermined values.

26. The method according to claim 21, further comprising the step of establishing a plurality of communication connections between a plurality of base transceiver stations and said subscriber station, said generating step occurring when said quality measurement unit determines that the transmission quality on all down-links of all said communication connections drop below a respective predetermined quality threshold.

27. The method according to claim 21, further comprising the step of generating a subscriber inter-frequency measurement trigger signal by making measurements in said subscriber station, said inter-frequency measurement unit operable to start said inter-frequency measurements when said network trigger signal and said subscriber trigger signal are generated.

28. The method according to claim 27, further comprising the step of transmitting said subscriber inter-frequency measurement trigger signal to said network control unit, said subscriber measurement trigger signal indicating said measurements performed in said subscriber station, said network handover unit generating and transmitting said network inter-frequency measurement signal when said measurements included in said subscriber inter-frequency measurement trigger signal indicate the necessity for a handover and said quality measurement unit determines that the transmission quality on the down-link of said communication connection has dropped below said predetermined quality measure.

29. The method according to claim 28, wherein said network inter-frequency measurement trigger signal is generated if said measurements included in said subscriber inter-frequency measurement trigger signal from said subscriber station indicate a handover, said quality measurement unit determines that the transmission quality on the down-link of said communication connection has dropped below said predetermined quality measure, and system information provided in the network control unit indicates a handover.

30. The method according to claim 27, further comprising the step of performing, by a subscriber handover unit, measurements by an average filtering of a pilot channel during a predetermined time.

31. The method according to claim 29, wherein said system information includes at least one of a total uplink interference level of the communication connection and a total down-link output power.

32. The method according to claim 28, wherein said network handover unit is operable to determine the necessity for a handover on the basis of a supervision of loads at all of said at least one base transceiver stations in the communication system.

33. The method according to claim 28, wherein at least one of said subscriber handover unit and said network handover unit determines the necessity for a handover on the basis of a supervision of the distance between said at least one base transceiver station and the subscriber station.

34. The method according to claim 28, wherein at least one of said subscriber handover unit and said network handover unit determines the necessity for a handover on the basis of a supervision of a measured pilot signal strength falling below a predetermined power threshold.

35. The method according to claim 28, wherein at least one of said subscriber handover unit and said network handover unit determines the necessity for a handover on the basis of a supervision that, in response to a power increase command by a base station, a subscriber station power adjustment module is unable to further increase its power on the uplink of said communication connection.

36. The method according to claim 21, wherein at least one of said network inter-frequency measurement trigger signal and a control signal from the network control unit indicates a time interval in which said subscriber station is to carry out said inter-frequency measurements.

37. A mobile communication system including at least one subscriber station having an inter-frequency measurement unit operable to perform said inter-frequency measurements, at least one base transceiver station, and a network control unit operable to establish at least one communication connection with said subscriber station, said system comprising:

a quality measurement unit in said network control unit, said quality measurement unit operable to monitor the transmission quality on a down-link of said at least one communication connection; and a network handover unit operable to generate a network inter-frequency measurement trigger signal when said transmission quality drops below a predetermined quality measure, said network handover unit sending said generated network inter-frequency measurement trigger signal to said subscriber station, said inter-frequency measurement unit operable to perform said inter-frequency measurements in said subscriber station in response to said network inter-frequency measurement trigger signal.

38. The system according to claim 37, further comprising a subscriber handover unit operable to perform measurements for generating a subscriber measurement trigger signal in said subscriber station, said inter-frequency measurement unit operable to start said inter-frequency measurements when said network trigger signal and said subscriber trigger signal are generated.

39. The system according to claim 38, wherein said subscriber handover unit is operable to transmit said subscriber inter-frequency measurement trigger signal to said network control unit, said subscriber inter-frequency signal indicating said measurements made by said subscriber handover unit, said network handover unit generating and transmitting said network inter-frequency measurement signal when said measurements in said subscriber inter-frequency measurement trigger signal indicate the necessity for a handover and said quality measurement unit determines that the transmission quality on the down-link of said at least one communication connection has dropped below said predetermined quality measure.

40. The system according to claim 39, wherein said network inter-frequency measurement trigger signal is generated by said network handover unit if said measurements in said subscriber inter-frequency measurement trigger signal from said subscriber station indicate a handover, said quality measurement unit determines that the transmission quality on the down-link of said at least one communication connection has dropped below said predetermined quality measure, and system information provided in the network control unit also indicates a handover.

41. The system according to claim 38, wherein said subscriber handover unit performs measurements by an average filtering of a pilot channel during a predetermined time.

42. The system according to claim 40, wherein said system information includes at least one of a total uplink interference level of the at least one communication connection and the total down-link output power.

43. The system according to claim 38, wherein said network handover unit is operable to determine the necessity for a handover on the basis of a supivision of loads at all of said at least one base transceiver stations in the communication system.

44. The system according to claim 38, wherein at least one of said subscriber handover unit and said network handover unit determines the necessity for a handover on the basis of a supervision of the distance between said at least one base transceiver station and the subscriber station.

45. The system according to claim 38, wherein at least one of said subscriber handover unit and said network handover unit determines the necessity for a handover on the basis of a supervision of a measured pilot signal strength falling below a predetermined power threshold.

46. The system according to claim 38, wherein at least one of said subscriber handover unit and said network handover unit determines the necessity for a handover on the basis of an output by a network power supervision unit, said output indicating that in response to a power increase command by said at least one base transceiver station a subscriber station power adjustment module is unable to further increase its power on the uplink of said at least one communication connection.

47. The system according to claim 37, wherein at least one of said network measurement trigger signal and a control signal from the network control unit indicates a time interval in which said subscriber station is to carry out said inter-frequency measurements.

48. A network control unit of a mobile communication system, said communication system having at least one subscriber station including an inter-frequency measurement unit operable to perform inter-frequency measurements, said communication system further including at least one base transceiver station operable to establish at least one communication connection with said subscriber station, said network control unit comprising:

a quality measurement unit operable to monitor the transmission quality on a down-link of said at least one communication connection; and a network handover unit operable to generate a network inter-frequency measurement trigger signal when said transmission quality drops below a predetermined quality measure, said network handover unit sending said generated network inter-frequency measurement trigger signal to said subscriber station, said inter-frequency measurement unit operable to perform said inter-frequency measurements in said subscriber station in response to said network inter-frequency measurement trigger signal.

49. A network control unit according to claim 48, further comprising a power measurement unit operable to measure a transmitted output power on the down-link, said network inter-frequency measurement trigger signal generated by said network handover unit when said transmitted output power on the downlink exceeds a predetermined power limit value.

50. The network control unit according to claim 49, wherein said network inter-frequency measurement trigger signal is generated by said network handover unit if said transmitted output power measured on the down-link by said power measurement unit exceeds said predetermined power limit value longer than a predetermined measurement interval.

51. The network control unit according to claim 49, wherein said quality measurement unit presets for the down-link a predetermined power offset value, an upper threshold value and a lower threshold value within which said measured down-link power is allowed to vary.

52. The network control unit according to claim 51, further comprising a calibration unit, said power offset value is variable dependent on a slow power control, said upper threshold value and said lower thresholds threshold value are dependent on a fast power control, said fast power control and said slow power control carried out by a power control unit of said network control unit, said calibration unit operable to calibrate to predetermined values at least one power step within a range determined by the upper threshold value, the lower threshold value and said variable power offset value.

53. The network control unit according to claim 48 wherein a plurality of communication connections are established between a plurality of base transceiver stations and said subscriber station, said network inter-frequency measurement trigger signal generated by said network handover unit when said quality measurement unit determines that the transmission quality on all down-links of all said communication connections drops below a respective predetermined quality measure.

* * * * *